(12) United States Patent
Aleem et al.

(10) Patent No.: US 12,711,709 B2
(45) Date of Patent: Aug. 18, 2026

(54) FIT PREDICTION BASED ON DETECTION OF METRIC FEATURES IN IMAGE DATA

(71) Applicant: GOOGLE LLC, Mountain View, CA (US)

(72) Inventors: Idris Syed Aleem, Kitchener (CA); Mayank Bhargava, Kitchener (CA); Sushant Umesh Kulkarni, Waterloo (CA)

(73) Assignee: Google LLC, Mountain View, CA (US)

( * ) Notice: Subject to any disclaimer, the term of this patent is extended or adjusted under 35 U.S.C. 154(b) by 283 days.

(21) Appl. No.: 18/156,156

(22) Filed: Jan. 18, 2023

(65) Prior Publication Data

US 2024/0242441 A1 Jul. 18, 2024

(51) Int. Cl.
*G06T 19/00* (2011.01)
*G01B 11/00* (2006.01)
(Continued)

(52) U.S. Cl.
CPC ............ *G06T 19/00* (2013.01); *G01B 11/002* (2013.01); *G01B 11/14* (2013.01); *G01P 13/00* (2013.01);
(Continued)

(58) Field of Classification Search
CPC ....... G01P 13/00; G02C 7/027; G02C 13/003; G06T 7/248; G06T 7/579; G06T 7/60;
(Continued)

(56) References Cited

U.S. PATENT DOCUMENTS

2013/0286161 A1* 10/2013 Lv ............................. G06T 7/55 348/46
2015/0103163 A1* 4/2015 Won ........................ G06T 7/579 348/140

(Continued)

FOREIGN PATENT DOCUMENTS

CN 110457092 A 11/2019
WO 2019216999 A1 11/2019

(Continued)

OTHER PUBLICATIONS

International Search Report and Written Opinion for PCT Application No. PCT/US2024/010315, mailed on Apr. 24, 2024, 12 pages.

*Primary Examiner* — William A Beutel
(74) *Attorney, Agent, or Firm* — Brake Hughes Bellermann LLP

(57) ABSTRACT

A system and method of predicting fit of a wearable device from image data obtained by a computing device together with position and orientation of the computing device is provided. The system and method may include capturing a series of frames of image data, and detecting one or more fixed features in the series of frames of image data. Position and orientation data associated with the capture of the image data is combined with the position data related to the one or more fixed features, to extract depth data from the series of frames of image data. A three-dimensional model is generated based on the extracted depth data. The three-dimensional model and/or key points extracted therefrom, can be processed by a simulator and/or a machine learning model to predict fit of the wearable device for the user.

20 Claims, 23 Drawing Sheets

(51) Int. Cl.

| | |
|---|---|
| ***G01B 11/14*** | (2006.01) |
| ***G01P 13/00*** | (2006.01) |
| ***G02C 7/02*** | (2006.01) |
| ***G06T 7/246*** | (2017.01) |
| ***G06T 7/579*** | (2017.01) |
| ***G06T 7/60*** | (2017.01) |
| ***G06T 17/00*** | (2006.01) |

(52) U.S. Cl.
CPC .............. *G02C 7/027* (2013.01); *G06T 7/248* (2017.01); *G06T 7/579* (2017.01); *G06T 7/60* (2013.01); *G06T 17/00* (2013.01); *G06T 2207/10016* (2013.01); *G06T 2207/20081* (2013.01); *G06T 2207/30041* (2013.01); *G06T 2207/30201* (2013.01)

(58) Field of Classification Search
CPC ........... G06T 17/00; G06T 2207/10016; G06T 2207/20081; G06T 2207/30041; G06T 2207/30201; G06T 2207/20084
See application file for complete search history.

(56) References Cited

U.S. PATENT DOCUMENTS

| | | | | |
|---|---|---|---|---|
| 2017/0263017 | A1 | 9/2017 | Wang | |
| 2020/0285081 | A1* | 9/2020 | Fonte | G02C 13/001 |
| 2021/0065285 | A1* | 3/2021 | Goldberg | G02C 13/005 |
| 2021/0088811 | A1 | 3/2021 | Varady et al. | |
| 2021/0133995 | A1* | 5/2021 | Farås | G06T 19/006 |
| 2022/0350985 | A1 | 11/2022 | Aleem et al. | |
| 2023/0168523 | A1* | 6/2023 | Varady | G02C 13/005 345/419 |

FOREIGN PATENT DOCUMENTS

| | | | |
|---|---|---|---|
| WO | 2022060520 | A1 | 3/2022 |
| WO | 2022066346 | A1 | 3/2022 |

* cited by examiner 214
224
216
222
440
405R
410L
430L
420L
415A
415B
425L
410R
430R
420R
425R
D21
D22
D23
D24
D25
HW2
ILCD2
IMCD2
NL2
NW2
A1
200

214
224
216
222
440
430L
410L
420L
415A
415B
425L
405L
D32
D34
D31
D33
D35
ILCD6
IMCD6
NW6
HW6
430R
410R
420R
425R
405R
A2
200

FIT PREDICTION BASED ON DETECTION OF METRIC FEATURES IN IMAGE DATA

TECHNICAL FIELD

This relates in general to the detection of scale from image data, and in particular to the detection of scale of facial features from image data together with position and/or orientation data, to predict fit of a wearable device.

BACKGROUND

A manner in which a wearable device fits a particular wearer may be dependent on features specific to the wearer, how the wearable device interacts with features associated with the specific body part at which the wearable device is worn by the wearer, and the like. In some situations, a wearer may want to customize a wearable device for fit and/or function. For example, when fitting a pair of glasses, the wearer may want to customize the glasses to incorporate selected frame(s), prescription/corrective lenses, a display device, computing capabilities, and other such features. Many existing systems for procurement of these types of wearable devices do not provide for accurate fitting and customization without access to a retail establishment and/or without the assistance of a technician and/or without access to specialized equipment. Existing virtual systems may provide a virtual try-on capability, but may lack the ability to accurately size the wearable device from images of the wearer without specialized equipment. This may result in improper fit of the delivered product. In the case of a head mounted wearable device, such as smart glasses that include display capability and computing capability, improper fit may compromise the functionality.

SUMMARY

Systems and methods are described herein that provide for the selection, sizing and/or fitting of a head mounted wearable device based on a series of frames of two-dimensional image data of a user. In some examples, the sizing and/or fitting of the head mounted wearable device may be accomplished based on the series of image data together with motion or movement related data associated with the computing device. The series of frames of image data may be captured via an application executing on a computing device operated by the user. A user mesh is generated, representative of the head, for example a portion of the head, such as the face of the user, based on one or more facial landmarks detected within the series of frames of two-dimensional image data. Changes in position of the one or more facial landmarks in the sequential image frames are correlated with changes in position and/or orientation of the computing device provided by position/orientations sensors of the computing device to determine depth data. The depth data is used to develop one or more depth maps which are fused to in turn generate a three-dimensional mesh, or a three-dimensional model, that is representative of the face and/or head of the user. The three-dimensional mesh, or model, and/or facial and/or cranial and/or ophthalmic measurements extracted therefrom, are provided to a simulator, to predict fit of a head mounted wearable device for the user.

The proposed solution in particular relates to a (computer-implemented) method, in particular a method for partially or fully automated selection, sizing and/or fitting of a head mounted wearable device to user-specific requirements, the method including capturing current image data, via an application executing on a computing device operated by a user, the current image data including a head of the user; detecting at least one fixed feature in the current image data; detecting a change in a position and an orientation of the computing device, from a previous position and a previous orientation corresponding to the capturing of previous image data, to a current position and a current orientation corresponding to the capturing of the current image data; detecting a change in a position of the at least one fixed feature between the current image data and the previous image data; correlating the change in the position and the orientation of the computing device with the change in the position of the at least one fixed feature; generating a three-dimensional model of the head of the user based on depth data extracted from the correlating of the change in position and orientation of the computing device with the change in position and orientation of the at least one fixed feature; and predicting, by a machine learning model accessible to the computing device, a fit of a head mounted wearable device on the head of the user based on the three-dimensional model of the head of the user.

The details of one or more implementations are set forth in the accompanying drawings and the description below. Other features will be apparent from the description and drawings, and from the claims.

DETAILED DESCRIPTION

Figure 1:
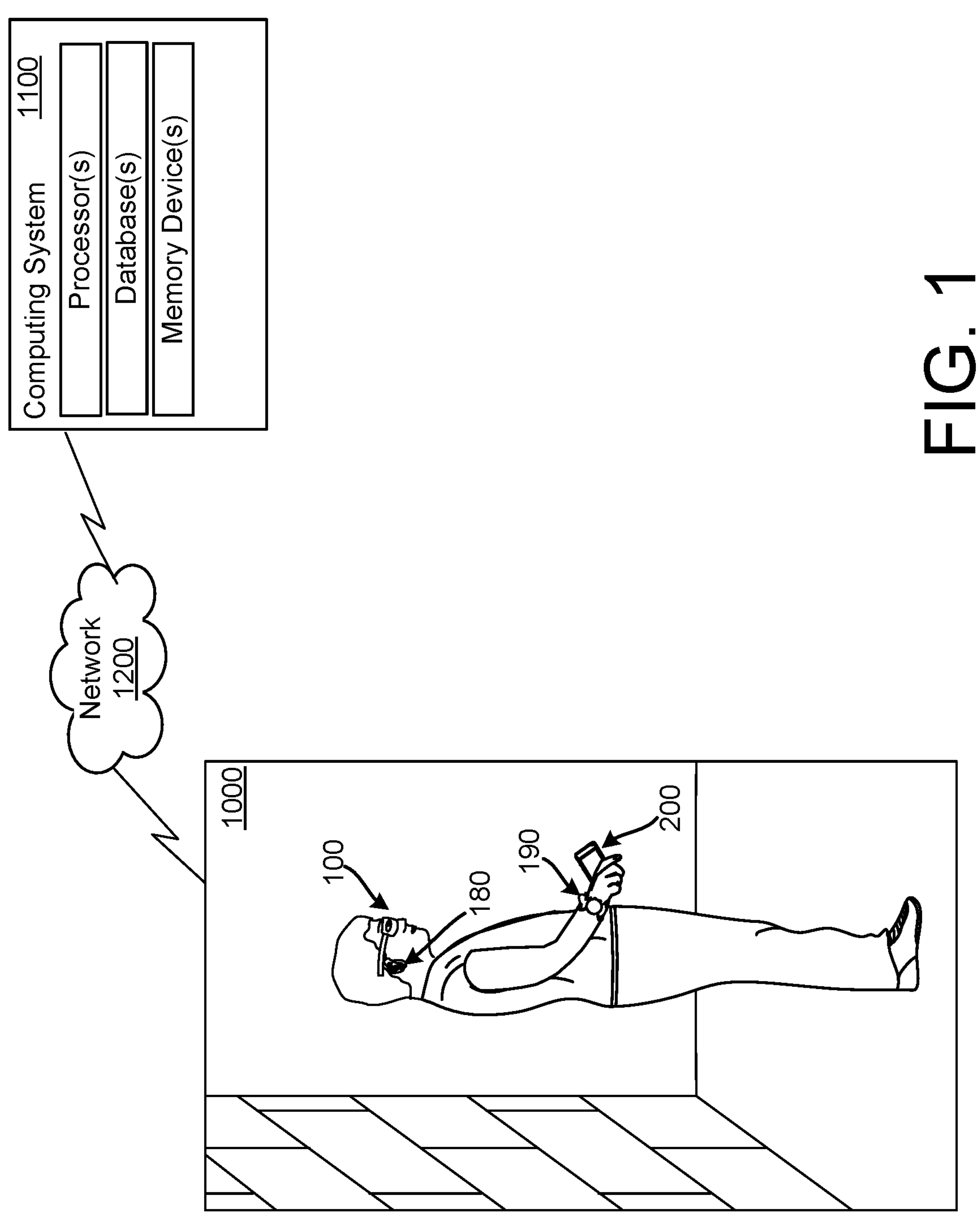
FIG. 1 illustrates an example system, in accordance with implementations described herein.

This disclosure relates to systems and methods for predicting fit of a wearable device for a user, based on image data captured by an image sensor of a computing device. Systems and methods, in accordance with implementations described herein, provide for the development of a depth map, and a three-dimensional mesh model, of a portion of the user on which the wearable device is to be worn. Systems and methods, in accordance with implementations described herein, provide for the development of a depth map and/or a three-dimensional mesh/three-dimensional model, from images captured by the image sensor of the computing device in which the image sensor does not include a depth sensor. In some implementations, the image sensor may be a front facing camera of a mobile device such as a smart phone or a tablet computing device. In some implementations, the depth map and/or the three-dimensional mesh/model may be developed from the images captured by the image sensor of the computing device. In some implementations, the depth map and/or the three-dimensional mesh/model may be developed from the images captured by the image sensor of the computing device combined with data provided by an inertial measurement unit (IMU) of the computing device. In some implementations, fixed landmarks may be detected in a series or sequence of frames of image data captured by the image sensor of the computing device. The depth map and/or the three-dimensional mesh/model may be developed based on locations of the fixed landmarks in the series frames of image data captured by the image sensor of the computing device, alone or together with data provided by the IMU of the computing device. Development of a depth map and/or a three-dimensional mesh in this manner may allow for sizing and/or fitting of a wearable device for the user based on images captured by the user, without the need for specialized equipment and/or without assistance from a technician and/or without access to a retail establishment for the sizing and/or fitting of the wearable device.

Hereinafter, systems and methods, in accordance with implementations described herein, will be described with respect to images captured by a handheld computing device for the fitting of a head mounted wearable device, such as, for example, glasses, including smart glasses having display capability and computing capability, simply for purposes of discussion and illustration. The principles to be described herein may be applied to the sizing and/or fitting of a wearable device from images captured by an image sensor of a computing device operated by a user, for use in a variety of other scenarios including, for example, the sizing and/or fitting of other types of wearable devices (including devices having display and/or computing capabilities), the sizing and/or fitting of apparel items, and the like, which may make use of the front facing camera of the computing device operated by the user. In some situations, the principles to be described herein may be applied to other types of scenarios such as, for example, the accommodation of furnishings in a space, and the like.

FIG. 1 is a third person view of a user in an ambient environment 1000, with one or more external computing systems 1100 accessible to the user via a network 1200. FIG. 1 illustrates numerous different wearable devices that are operable by the user, including a first wearable device 100 in the form of glasses worn on the head of the user, a second wearable device 180 in the form of ear buds worn in one or both ears of the user, a third wearable device 190 in the form of a watch worn on the wrist of the user, and a handheld computing device 200 held by the user. In some examples, the first wearable device 100 is in the form of a pair of smart glasses including, for example, a display, one or more images sensors that can capture images of the ambient environment, audio input/output devices, user input capability, computing/processing capability and the like. In some examples, the second wearable device 180 is in the form of an ear worn computing device such as headphones, or earbuds, that can include audio input/output capability, an image sensor that can capture images of the ambient environment, computing/processing capability, user input capability and the like. In some examples, the third wearable device 190 is in the form of a smart watch or smart band that includes, for example, a display, an image sensor that can capture images of the ambient environment, audio input/output capability, computing/processing capability, user input capability and the like. In some examples, the handheld computing device 200 can include a display, one or more image sensors that can capture images of the ambient environment, audio input/output capability, computing/processing capability, user input capability, and the like, such as in a smartphone. In some examples, the example wearable devices 100, 180, 190 and the example handheld computing device 200 can communicate with each other and/or with the external computing system(s) 1100 to exchange information, to receive and transmit input and/or output, and the like. The principles to be described herein may be applied to other types of wearable devices not specifically shown in FIG. 1.

Hereinafter, systems and methods will be described with respect to the sizing and/or fitting of a wearable device, such as, for example, one of the wearable devices 100, 180, 190 shown in FIG. 1, from images captured by one or more image sensors of the example handheld computing device 200 operated by the user, for purposes of discussion and illustration. Principles to be described herein may be applied to images captured by other types of computing devices. Principles to be described herein may be applied to the sizing and/or fitting of other types of wearable devices, with or without display capability, and with or without computing capability. Hereinafter, systems and methods will be described with respect to the sizing and/or fitting or a wearable device from images of the face/head of the user, together with position and/or acceleration data provided by the computing device 200, for example, for the fitting of a head mounted wearable device, simply for purposes of discussion and illustration. Principles to be described herein may be similarly used for sizing and/or fitting from images captured by a computing device, together with position/acceleration data provided by the computing device, for other purposes such as, for example, the sizing and/or fitting of other types of wearable devices including apparel, the insertion of augmented reality items into an augmented reality scene and/or a real world scene, and the like.

In some situations, a user may choose to use a computing device (such as the example handheld computing device 200 shown in FIG. 1, or another computing device) for the virtual selection, sizing and fitting of a wearable device, such as the example first wearable device 100 in the form of glasses described above. For example, a user may use an application executing on the example computing device 200 to select glasses for virtual try on, and for the virtual sizing and fitting of selected glasses. In order to provide for the virtual sizing and/or fitting of a wearable device such as the example glasses, the user may use an image sensor of the example computing device 200 to capture images, for example a series of images, of the face/head of the user. In some examples, the images may be captured by the image sensor via an application executing on the computing device 200. In some examples, fixed features, or landmarks, may be detected within the series of images captured by the image sensor of the computing device 200. In some examples, position and/or orientation data provided by a sensor of the computing device 200 may be combined with the detection of landmarks and/or fixed features in the series of images. The combination of the detected landmarks and/or features in the series of images together with the position and/or orientation data associated with the computing device 200 as the series of images are captured, may allow a depth map to be developed without the use of specialized equipment such as, for example a depth sensor in operation as the images are captured. A three-dimensional mesh, for example, of the face/head of the user, may be developed from the depth data collected in this manner, as the series of images is captured, and the detected landmarks and/or features in the series of images is combined with the position and/or orientation data associated with the computing device 200 as the series of images are captured. The resulting three-dimensional mesh may be processed, for example by a sizing simulator, to predict sizing and/or fitting of the wearable device, such as the example first wearable device 100 in the form of glasses. The ability to accurately predict fit in this manner may simplify the process associated with the fitting of a wearable device such as, for example the wearable device 100 in the form of glasses as described above, making such wearable device more easily accessible to a wide variety of users.

Figure 2A:
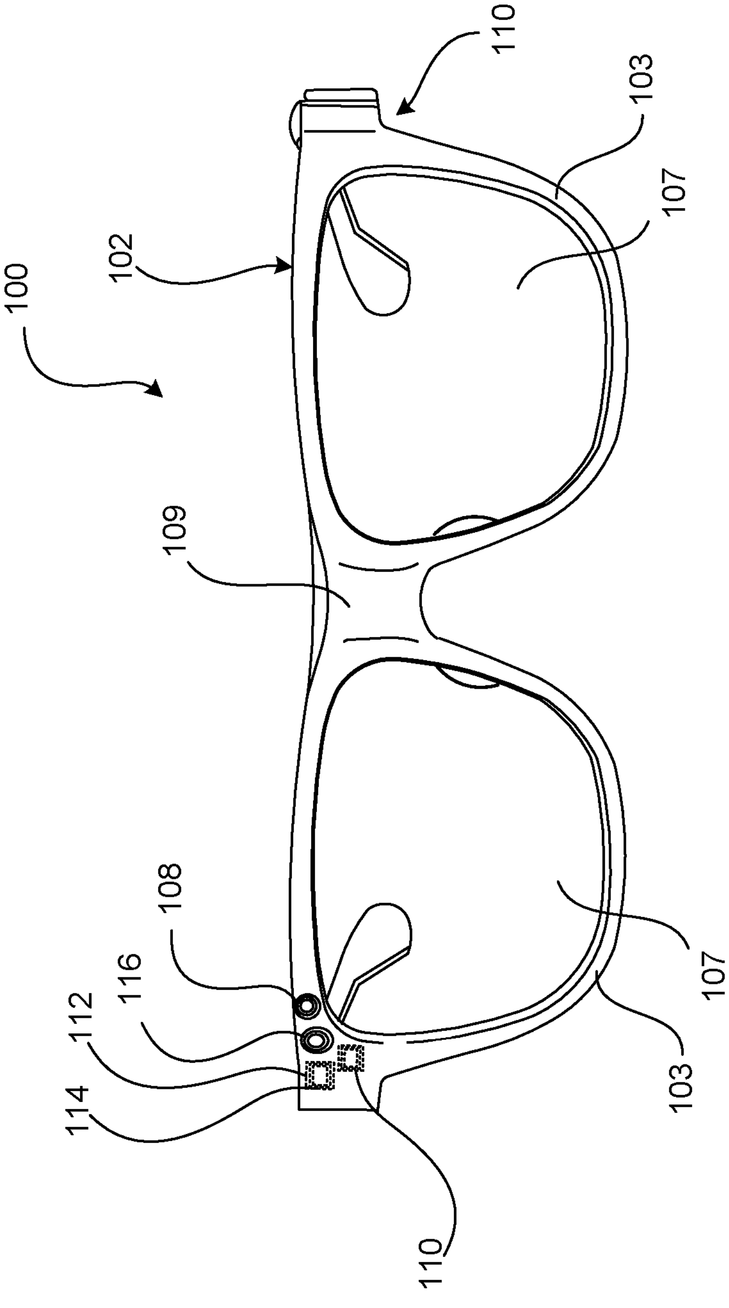
FIG. 2A is a front view of one of the example wearable devices shown in FIG. 1.
Figure 2B:
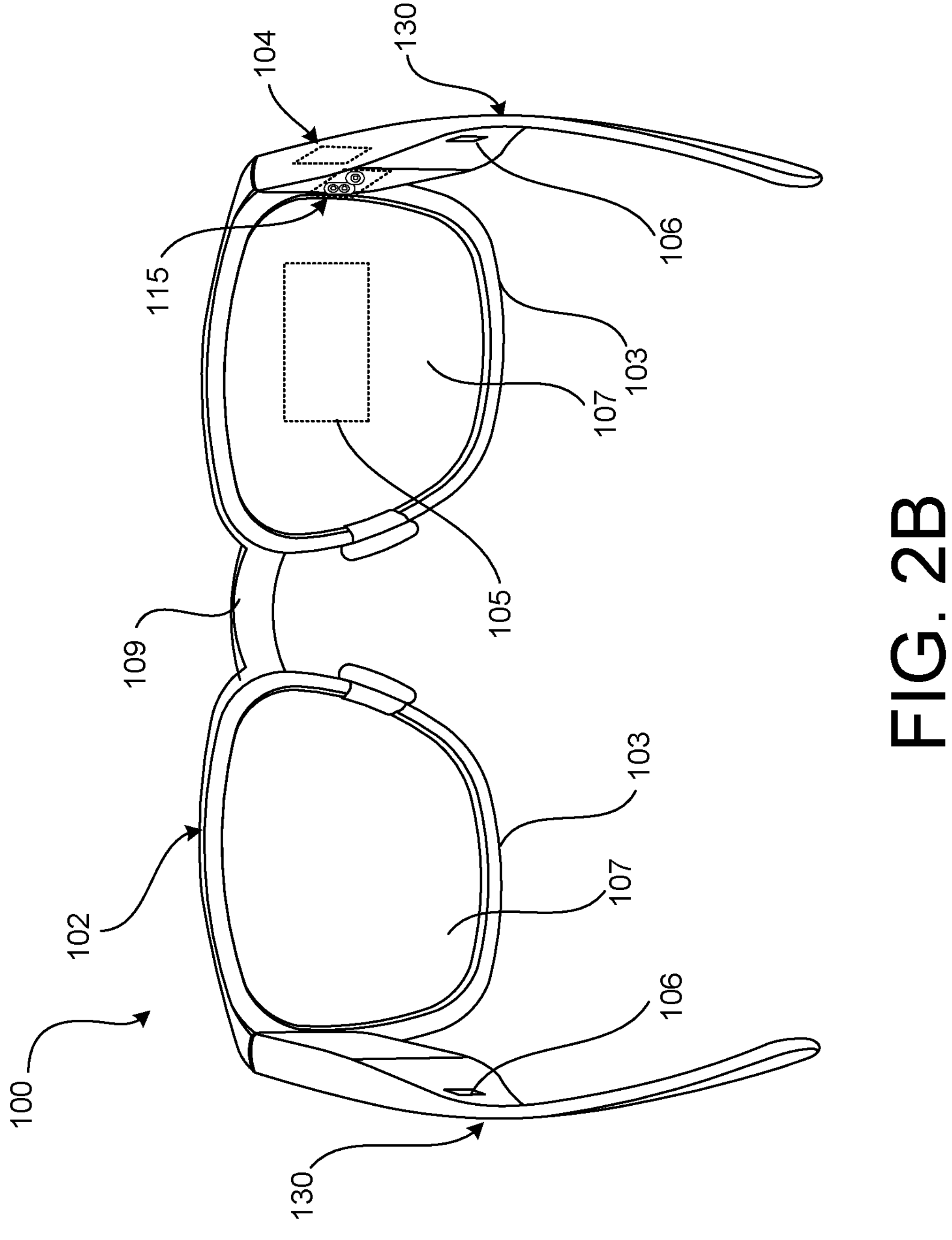
FIG. 2B is a rear view of the example wearable device shown in FIG. 2A.

An example head mounted wearable device 100 in the form of a pair of smart glasses is shown in FIGS. 2A and 2B, for purposes of discussion and illustration. The example head mounted wearable device 100 includes a frame 102 having rim portions 103 surrounding glass portion, or lenses 107, and arm portions 130 coupled to a respective rim portion 103. In some examples, the lenses 107 may be corrective/prescription lenses. In some examples, the lenses 107 may be glass portions that do not necessarily incorporate corrective/prescription parameters. A bridge portion 109 may connect the rim portions 103 of the frame 102. In the example shown in FIGS. 2A and 2B, the wearable device 100 is in the form of a pair of smart glasses, or augmented reality glasses, simply for purposes of discussion and illustration. The principles to be described herein can be applied to the sizing and/or fitting of a head mounted wearable device in the form of glasses that do not include the functionality typically associated with smart glasses. The principles to be described herein can be applied to the sizing and/or fitting of a head mounted wearable device in the form of glasses (including smart glasses, or eyewear that does not include the functionality typically associated with smart glasses) that include corrective/prescription lenses.

In some examples, the wearable device 100 includes a display device 104 that can output visual content, for example, at an output coupler 105, so that the visual content is visible to the user. In the example shown in FIGS. 2A and 2B, the display device 104 is provided in one of the two arm portions 130, simply for purposes of discussion and illustration. Display devices 104 may be provided in each of the two arm portions 130 to provide for binocular output of content. In some examples, the display device 104 may be a see through near eye display. In some examples, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) output by the display device 104. In some implementations, waveguide optics may be used to depict content on the display device 104.

The example wearable device 100, in the form of smart glasses as shown in FIGS. 2A and 2B, includes one or more of an audio output device 106 (such as, for example, one or more speakers), an illumination device 108, a sensing system 110, a control system 112, at least one processor 114, and an outward facing image sensor 116 (for example, a camera). In some examples, the sensing system 110 may include various sensing devices and the control system 112 may include various control system devices including, for example, the at least one processor 114 operably coupled to the components of the control system 112. In some examples, the control system 112 may include a communication module providing for communication and exchange of information between the wearable device 100 and other external devices. In some examples, the head mounted wearable device 100 includes a gaze tracking device 115 to detect and track eye gaze direction and movement. Data captured by the gaze tracking device 115 may be processed to detect and track gaze direction and movement as a user input. In the example shown in FIGS. 2A and 2B, the gaze tracking device 115 is provided in one of two arm portions 130, simply for purposes of discussion and illustration. In the example arrangement shown in FIGS. 2A and 2B, the gaze tracking device 115 is provided in the same arm portion 130 as the display device 104, so that user eye gaze can be tracked not only with respect to objects in the physical environment, but also with respect to the content output for display by the display device 104. In some examples, gaze tracking devices 115 may be provided in each of the two arm portions 130 to provide for gaze tracking of each of the two eyes of the user. In some examples, display devices 104 may be provided in each of the two arm portions 130 to provide for binocular display of visual content.

The example wearable device 100 can include more, or fewer features than described above. The principles to be described herein are applicable to the virtual sizing and/or fitting of head mounted wearable devices including display capability and/or computing capability, i.e., smart glasses, and also to head mounted wearable devices that do not include display and/or computing capabilities, and to head mounted wearable devices with or without corrective lenses.

Figure 2C:
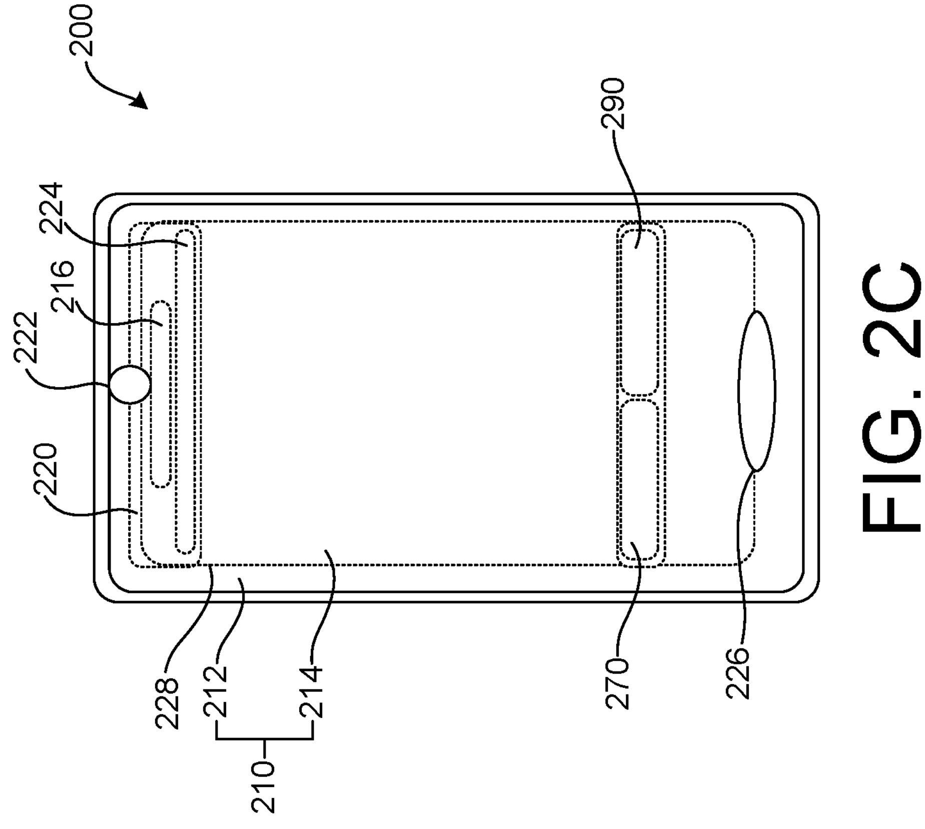
FIG. 2C is a front view of an example handheld computing device shown in FIG. 1.

FIG. 2C is a front view of an example computing device, in the form of the example handheld computing device 200 shown in FIG. 1. The example computing device 200 may include an interface device 210. In some implementations, the interface device 210 may function as an input device, including, for example, a touch surface 212 that can receive touch inputs from the user. In some implementations, the interface device 210 may function as an output device, including, for example, a display portion 214 allowing the interface device 210 to output information to the user. In some implementations, the interface device 210 can function as an input device and an output device. The example computing device 200 may include an audio output device 216, or speaker, that outputs audio signals to the user.

The example computing device 200 may include a sensing system 220 including various sensing system devices. In some examples, the sensing system devices include, for example, one or more image sensors, one or more position and/or orientation sensors, one or more audio sensors, one or more touch input sensors, and other such sensors. The example computing device 200 shown in FIG. 2C includes an image sensor 222. In the example shown in FIG. 2C, the image sensor 222 is a front facing camera. The example computing device 200 may include additional image sensors such as, for example, a world facing camera. The example computing device 200 shown in FIG. 2C includes an inertial measurement unit (IMU) 224 including, for example, one or more position sensors and/or orientation sensors and/or acceleration sensors such as, for example, an accelerometer, a gyroscope, a magnetometer, and other such sensors that can provide position and/or orientation and/or acceleration data. The example computing device 200 shown in FIG. 2C includes an audio sensor 226 that can detect audio signals, for example, for processing as user inputs. The example computing device 200 shown in FIG. 2C includes a touch sensor 228, for example corresponding to the touch surface 212 of the interface device 210. The touch sensor 228 can detect touch input signals for processing as user inputs. The example computing device 200 may include a control system 270 including various control system devices. The example computing device 200 may include a processor 290 to facilitate operation of the computing device 200.

As noted above, a computing device such as the example handheld computing device 200 may be used to capture images of the user. The images may be used, together with position data and/or orientation data of the example handheld computing device 200, to develop one or more depth map(s) from which a three-dimensional mesh may be developed. The three-dimensional mesh may be provided to, for example, a sizing and/or fitting simulator for the virtual sizing and/or fitting of a wearable device such as the example head mounted wearable device 100 described above. This may allow the user to use the computing device 200 for the virtual selection and sizing/fitting of the wearable device 100, such as the glasses described above, without the use of specialized equipment, without a proctored virtual fitting, without access to a retail establishment, and the like.

Figure 3:
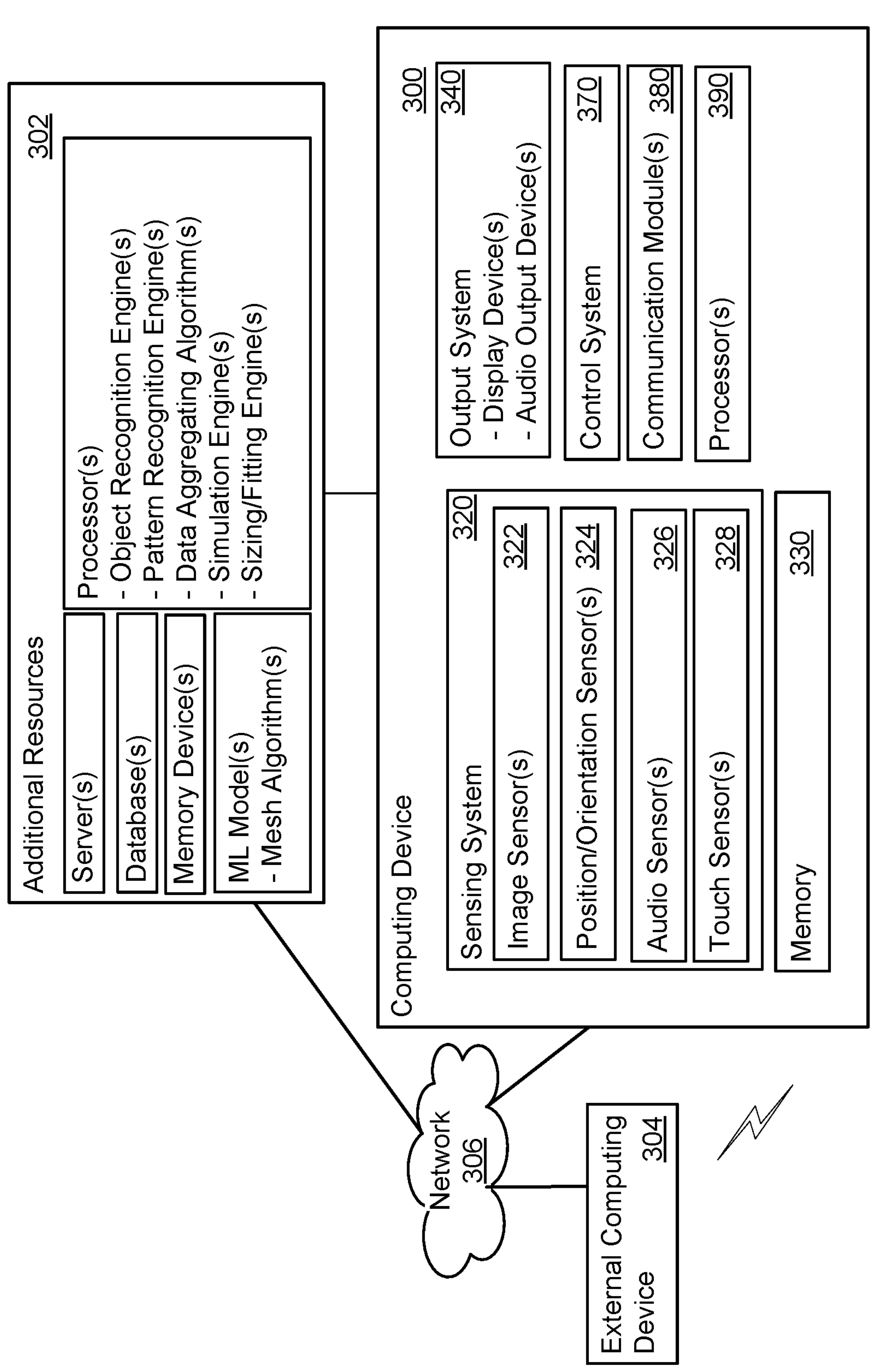
FIG. 3 is a block diagram of a system, in accordance with implementations described herein.

FIG. 3 is a block diagram of an example system for sizing and/or fitting of a wearable device from images captured by a computing device. Wearable devices to be sized and/or fitted in this manner can include the various example wearable computing devices described above, as well as other types of wearable devices such as clothing, accessories and the like.

The system may include a computing device 300. The computing device 300 can access additional resources 302 to facilitate the sizing and/or fitting of a wearable device. In some examples, the additional resources may be available locally on the computing device 300. In some examples, the additional resources may be available to the computing device 300 via a network 306. In some examples, some of the additional resources 302 may be available locally on the computing device 300, and some of the additional resources 302 may be available to the computing device 300 via the network 306. The additional resources 302 may include, for example, server computer systems, processors, databases, memory storage, and the like. In some examples, the processor(s) may include object recognition engine(s) and/or module(s), pattern recognition engine(s) and/or module(s), configuration identification engine(s) and/or modules(s), simulation engine(s) and/or module(s), sizing/fitting engine(s) and/or module(s), and other such processors.

The computing device 300 can operate under the control of a control system 370. The computing device 300 can communicate with one or more external devices 304, either directly (via wired and/or wireless communication), or via the network 306. In some examples, the one or more external devices may include another wearable computing device, another mobile computing device, and the like. In some implementations, the computing device 300 includes a communication module 380 to facilitate external communication. In some implementations, the computing device 300 includes a sensing system 320 including various sensing system components. The sensing system components may include, for example one or more image sensors 322, one or more position/orientation sensor(s) 324 (including for example, an inertial measurement unit, an accelerometer, a gyroscope, a magnetometer and other such sensors), one or more audio sensors 326 that can detect audio input, one or more touch input sensors 328 that can detect touch inputs, and other such sensors. The computing device 300 can include more, or fewer, sensing devices and/or combinations of sensing devices.

In some implementations, the one or more image sensor(s) 322 may include, for example, cameras such as, for example, one or more forward facing cameras, one or more outward, or world facing, cameras, and the like. The one or more image sensor(s) 322 can capture still and/or moving images of an environment outside of the computing device 300. The still and/or moving images may be displayed by a display device of an output system 340, and/or transmitted externally via a communication module 380 and the network 306, and/or stored in a memory 330 of the computing device 300. The computing device 300 may include one or more processor(s) 390. The processors 390 may include various modules or engines configured to perform various functions. In some examples, the processor(s) 390 may include object recognition engine(s) and/or module(s), pattern recognition engine(s) and/or module(s), configuration identification engine(s) and/or modules(s), simulation engine(s) and/or module(s), sizing/fitting engine(s) and/or module(s), and other such processors. The processor(s) 390 may be formed in a substrate configured to execute one or more machine executable instructions or pieces of software, firmware, or a combination thereof. The processor(s) 390 can be semiconductor-based including semiconductor material that can perform digital logic. The memory 330 may include any type of storage device that stores information in a format that can be read and/or executed by the processor(s) 390. The memory 330 may store applications and modules that, when executed by the processor(s) 390, perform certain operations. In some examples, the applications and modules may be stored in an external storage device and loaded into the memory 330.

Figure 4A:
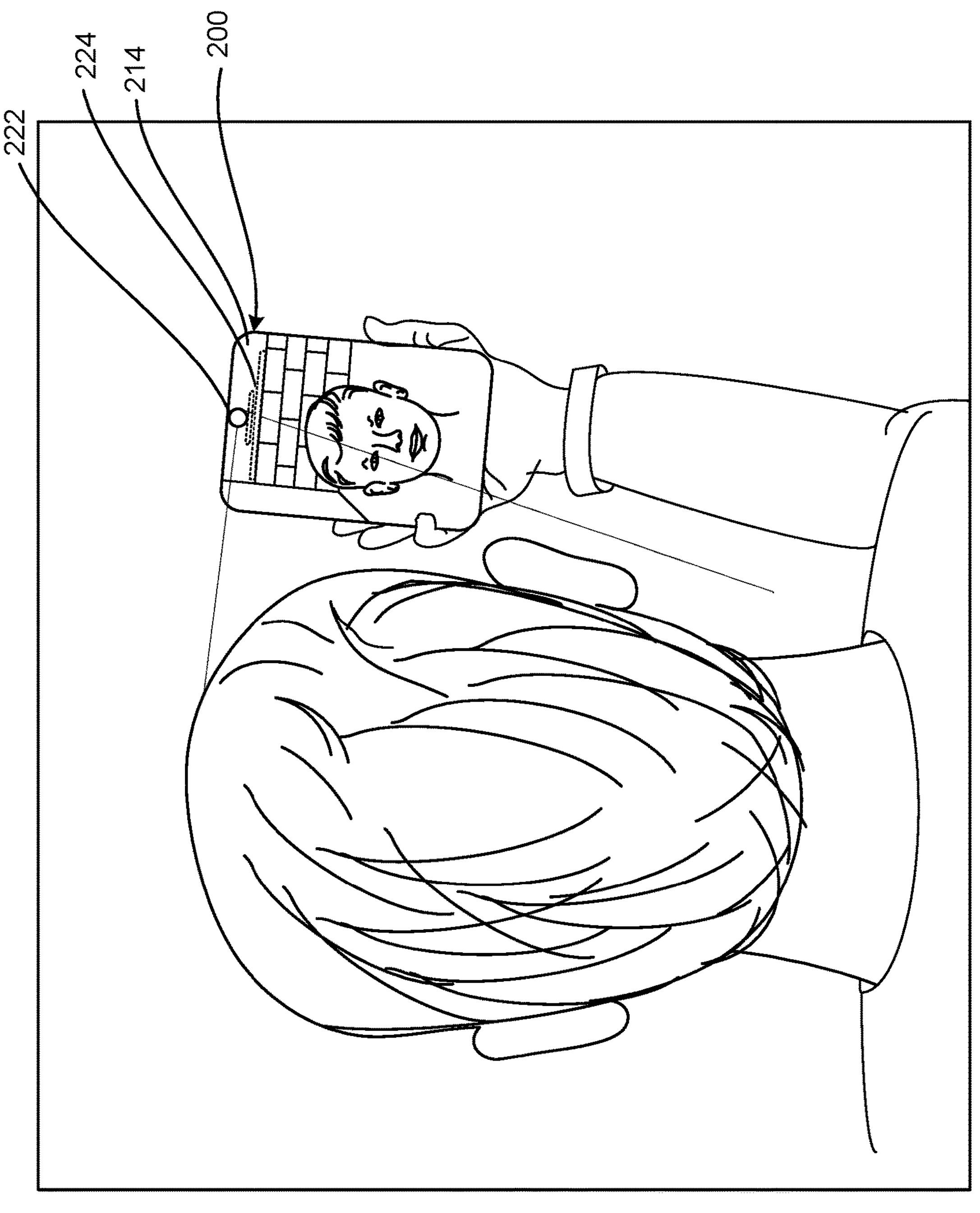
FIG. 4A illustrates an example computing device in an image capture mode.

FIG. 4A illustrates the use of a computing device, such as the example handheld computing device 200 shown in FIGS. 1 and 2C, to capture images for the virtual selection and/or fitting of a wearable device such as the example head mounted wearable device 100 shown in FIGS. 1, 2A and 2B. In particular, FIG. 4A illustrates the use of a computing device to capture images, using a front facing camera of the computing device, for use in the virtual selection and/or sizing and/or fitting of a wearable device. As noted above, the principles described herein can be applied to the use of other types of computing devices and/or to the selection and/or sizing and/or fitting of other types of wearable devices.

Figure 4B:
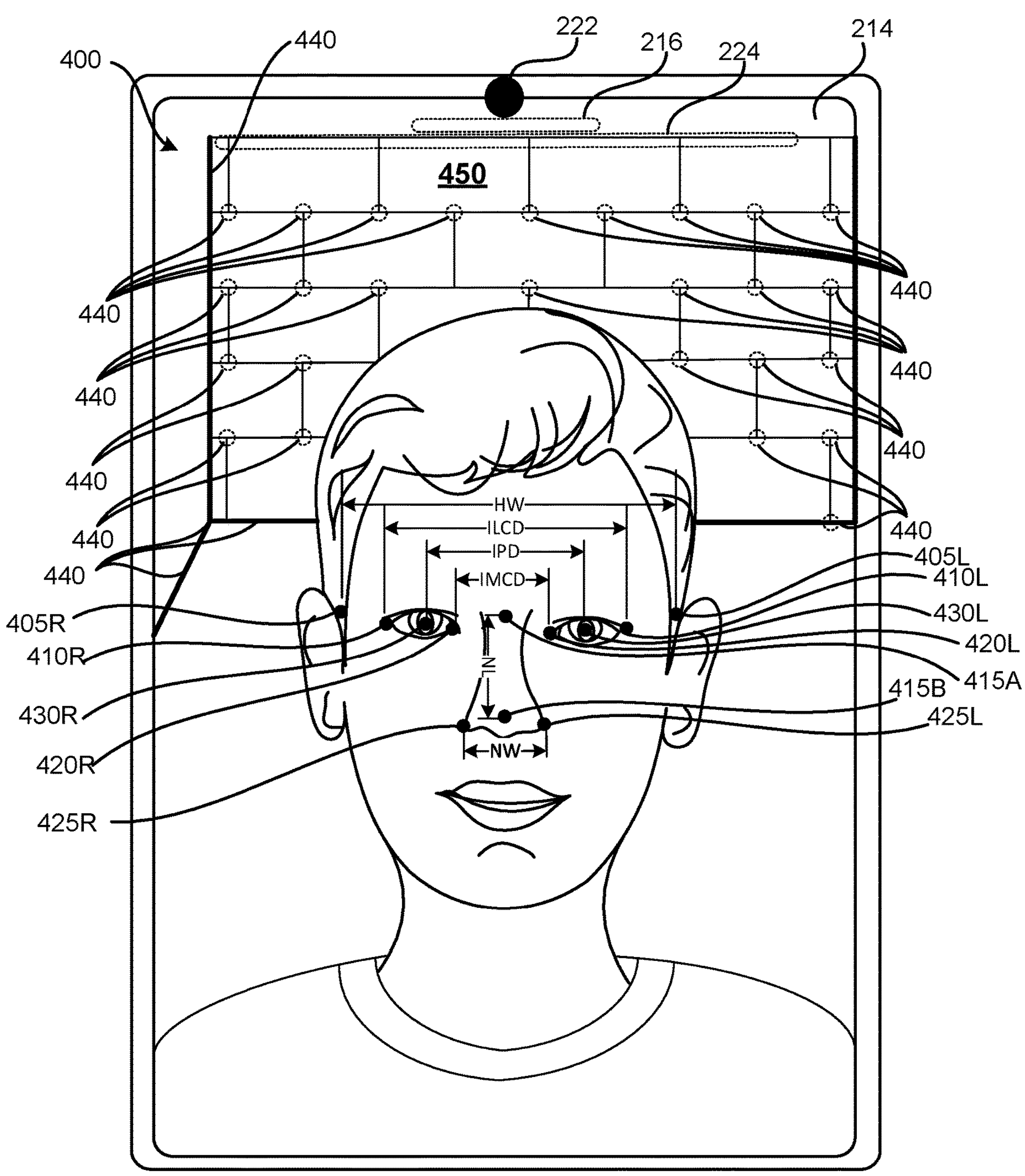
FIG. 4B illustrates an example display portion of the example computing device shown in FIG. 4A.

In the example shown in FIG. 4A, the user is holding the example handheld computing device 200 so that the head and face of the user is in the field of view of the image sensor 222 of the computing device 200. In particular, the head and face of the user is in the field of view of the image sensor 222 of the front facing camera of the computing device 200, so that the image sensor 222 can capture images of the head and face of the user. In some examples, images captured by the image sensor 222 are displayed to the user on the display portion 214 of the computing device 200, so that the user can verify the initial positioning of the head and face of the user within the field of view of the image sensor 222. FIG. 4B illustrates an example image frame 400 captured by the image sensor 222 of the computing device 200 during an image data capture process using the computing device 200 operated by the user as shown in FIG. 4A. The image data captured by the image sensor 222 may be processed, for example, by resources available to the computing device 200 as described above (for example, the additional resources 302 described above with respect to FIG. 3) for the virtual selection and/or sizing and/or fitting of a wearable device. In some examples, the capture of images and the accessing of the additional resources may be performed via an application executing on the computing device 200.

Systems and methods, in accordance with implementations described herein, may detect one or more features, or landmarks, or key points, within image data represented by a series of images, or image frames, captured in this manner. One or more algorithms may be applied to combine the one or more features and/or landmarks and/or key points, with position and/or orientation data provided by sensors such as, for example, position and/or orientation sensors included in the IMU 224 of the computing device 200, as the series of images is captured.

As shown in FIG. 4B, the image data captured by the image sensor 222 may be processed, for example, by a recognition engine of the additional resources 302, to detect and/or identify various fixed features and/or landmarks and/or key points in the image data/series of image frames captured by the image sensor 222. In the example shown in FIG. 4B, various example facial landmarks have been identified in the example image frame 400. In some examples, the example facial landmarks may represent facial landmarks that remain substantially fixed, even in the event of changes in facial expression and the like. In the example shown in FIG. 4B, the example facial landmarks include a first landmark 410R representing an outer corner of the right eye, and a second landmark 410L representing an outer corner of the left eye. A distance between the first landmark 410R and the second landmark 410L may represent an inter-lateral commissure distance (ILCD). The first landmark 410R and the second landmark 410R, from which the measure for ILCD are taken, may remain relatively fixed, or relatively stable, regardless of eye gaze direction, facial expression, head orientation and the like, across a series of image frames captured by the image sensor 222.

In the example shown in FIG. 4B, the example facial landmarks include a third landmark 420R representing an inner corner of the right eye, and a fourth landmark 420L representing an inner corner of the left eye. A distance between the third landmark 420R and the fourth landmark 420L may represent an inter-medial commissure distance (IMCD). The third landmark 420R and the fourth landmark 420R, from which the measurement for IMCD are taken, may remain relatively fixed, or relatively stable, regardless of eye gaze direction, facial expression, head orientation and the like, across a series of image frames captured by the image sensor 222.

In the example shown in FIG. 4B, the example facial landmarks include a fifth landmark 430R representing a pupil center of the right eye, and a sixth landmark 430L representing a pupil center of the left eye. A distance between the fifth landmark 430R and the sixth landmark 430L may represent an inter-pupillary distance (IPD). The fifth landmark 430R and the sixth landmark 430L, from which the measurement for IPD are taken, may remain relatively fixed, or relatively stable, in a situation in which user gaze is focused on a point in the distance as the series of images are captured by the image sensor 222.

In the example shown in FIG. 4B, the example facial landmarks include a seventh landmark 405L representing an ear saddle point of the right ear, and an eighth landmark 405R representing an ear saddle point of the left ear. A distance between the seventh landmark 405L and the eighth landmark 405R may be representative of a head width HW, or a width of the user's head at a portion of the head at which the head mounted wearable device 100 (for example, in the form of glasses) would be worn. The seventh landmark 405L and the eighth landmark 405R, from which the measure for head width HW are taken, may remain relatively fixed, or relatively stable, regardless of facial expression, head orientation and the like, across a series of image frames captured by the image sensor 222.

In the example shown in FIG. 4B, the example facial landmarks include a ninth landmark 415A representing a nose bridge, or a sellion, and a tenth landmark 415B representing a nose tip. A distance between the ninth landmark 415A and the tenth landmark 415B may be representative of a nose length NL. In some examples, the ninth landmark 415A, representing the nose bridge, or sellion, may correspond to a portion of the nose at which the bridge portion 109 of the example head mounted wearable device 100 would be seated on the nose of the user. The ninth landmark 415A and the tenth landmark 415B, from which the measure for nose length NL are taken, may remain relatively fixed, or relatively stable, regardless of facial expression, head orientation and the like, across a series of image frames captured by the image sensor 222.

In the example shown in FIG. 4B, the example facial landmarks include an eleventh landmark 425R representing a right most point of the nose, or nostril, and a twelfth landmark 425L representing a left most point of the nose, or nostril. A distance between the eleventh landmark 425R and the twelfth landmark 425L may be representative of a nose width NW. In some examples, the eleventh landmark 425R and the twelfth landmark 425L, from which the measure for nose width NW are taken, may remain relatively fixed, or relatively stable, across a series of image frames captured by the image sensor 222.

In the example shown in FIG. 4B, example fixed, or static features, or landmarks, or key points, or elements 440 are identified in a background 450 of the image data captured by the image sensor 222. In the example shown in FIG. 4B, the fixed, or static features, or landmarks, or key points, or elements 440 represent relatively clearly defined and/or clearly identifiable features, for example, clearly defined geometric features such as corners, intersections and the like, that remain fixed, or stable, across the series of image frames captured by the image sensor 222.

FIGS. 5A-5F illustrate the use of a computing device, such as the example handheld computing device 200 shown in FIGS. 1 and 2C, to capture image data. In particular, FIGS. 5A-5F illustrate a first series of movements of the example handheld computing device 200 to capture image data including a first series of image frames, capturing a first series of perspectives of the face and/or head of the user for use in predicting virtual sizing and/or fitting of a wearable device such as the example head mounted wearable device 100 shown in FIGS. 1, 2A and 2B.

Figure 5A:
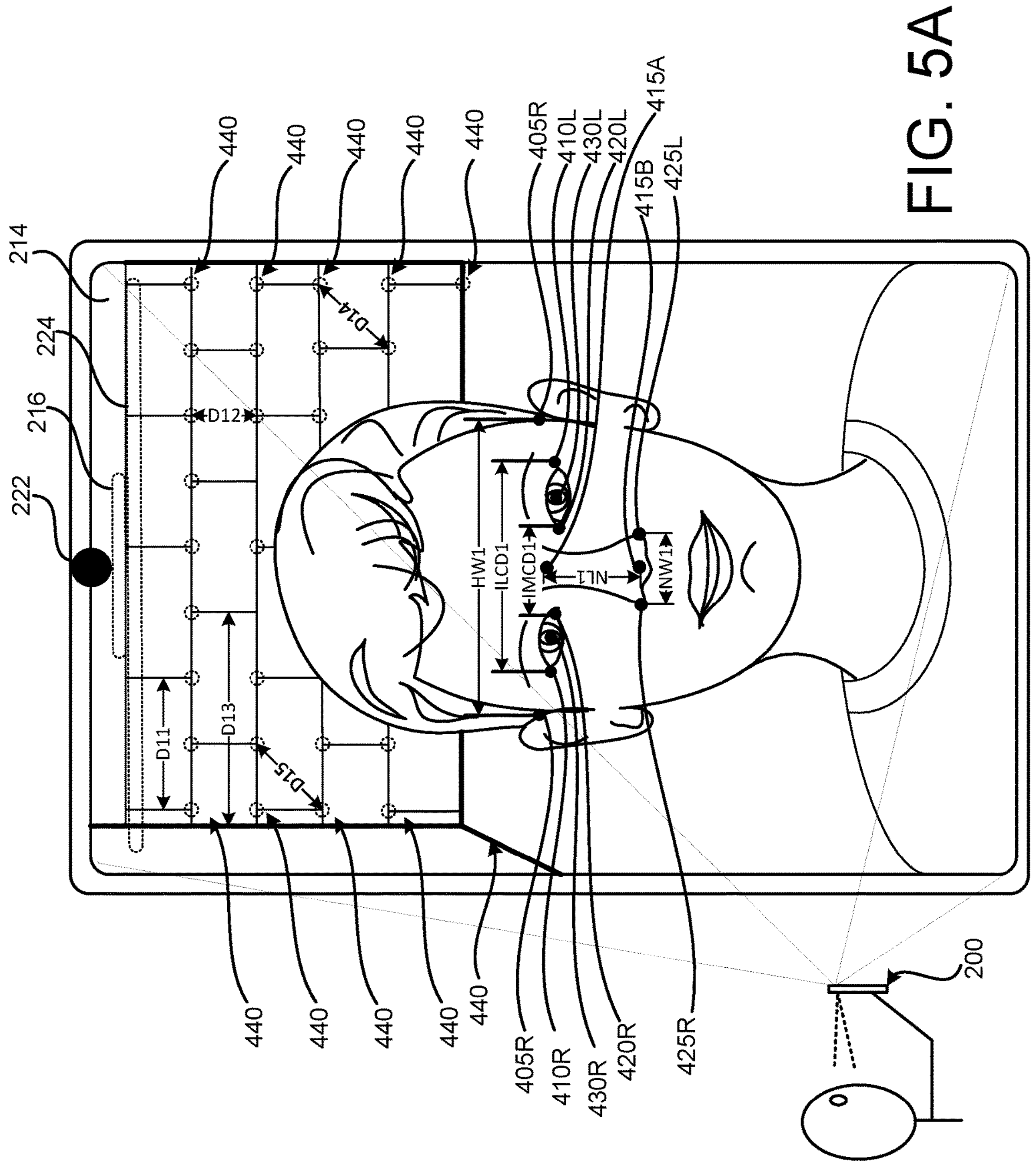
FIGS. 5A-5F illustrate example image data capture using an example computing device.

In the example shown in FIG. 5A, the user has initiated the capture of image data for example, via an application executing on the example handheld computing device 200. In FIG. 5A, the computing device 200 is positioned so that the head and face of the user is captured within the field of view of the image sensor 222. In the example shown in FIG. 5A, the image sensor 222 is included in the front facing camera of the computing device 200, and the head and face of the user are captured within the field of view of the front facing camera of the computing device 200. In the initial position shown in FIG. 5A, the computing device 200 is positioned substantially straight out from the head and face of the user, somewhat horizontally and vertically aligned with the head and face of the user, simply for purposes of discussion and illustration. The capture of image data by the image sensor 222 of the computing device 200 can be initiated at other positions of the computing device 200 relative to the head and face of the user.

Figure 5B:
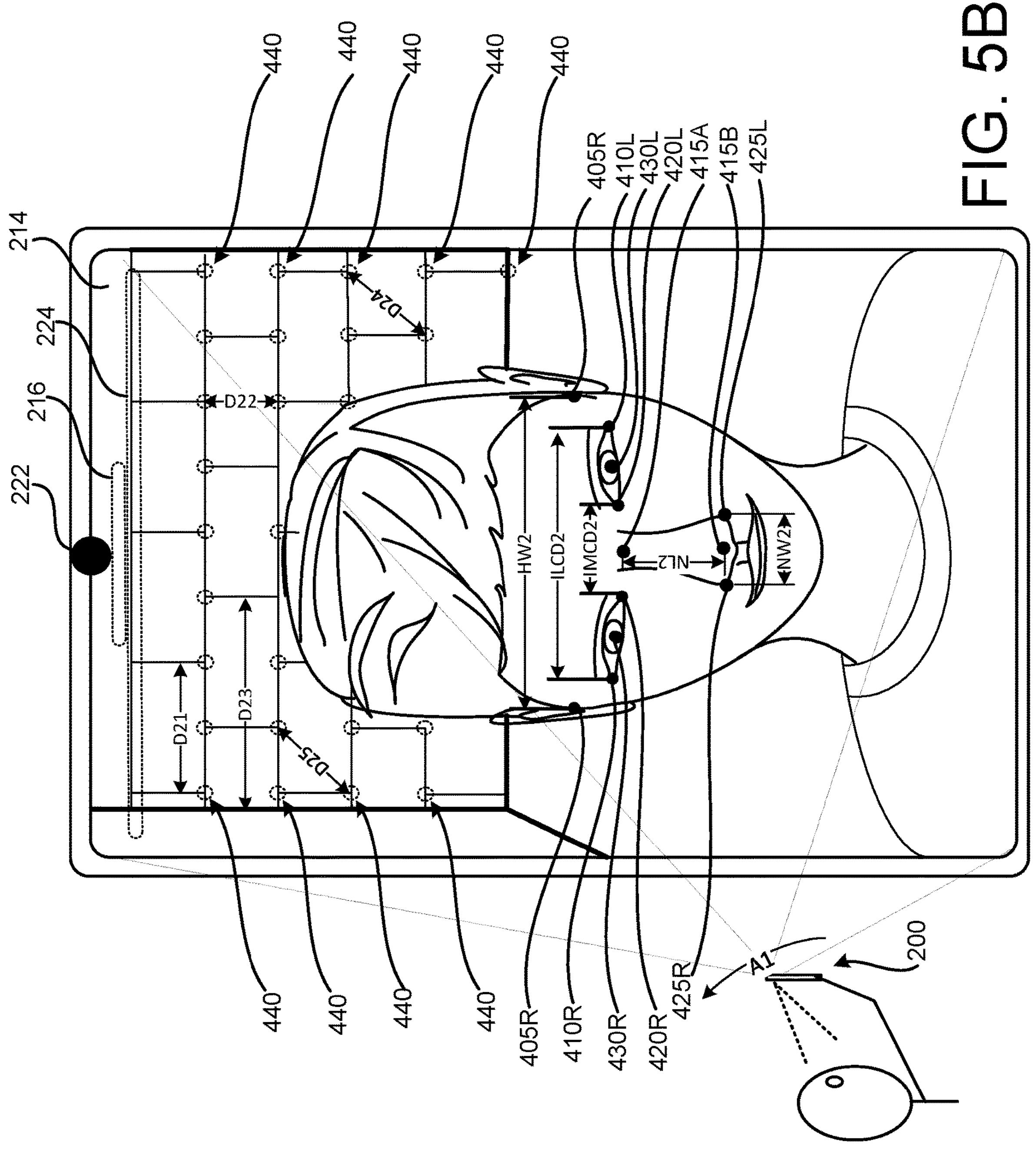
Figure 5C:
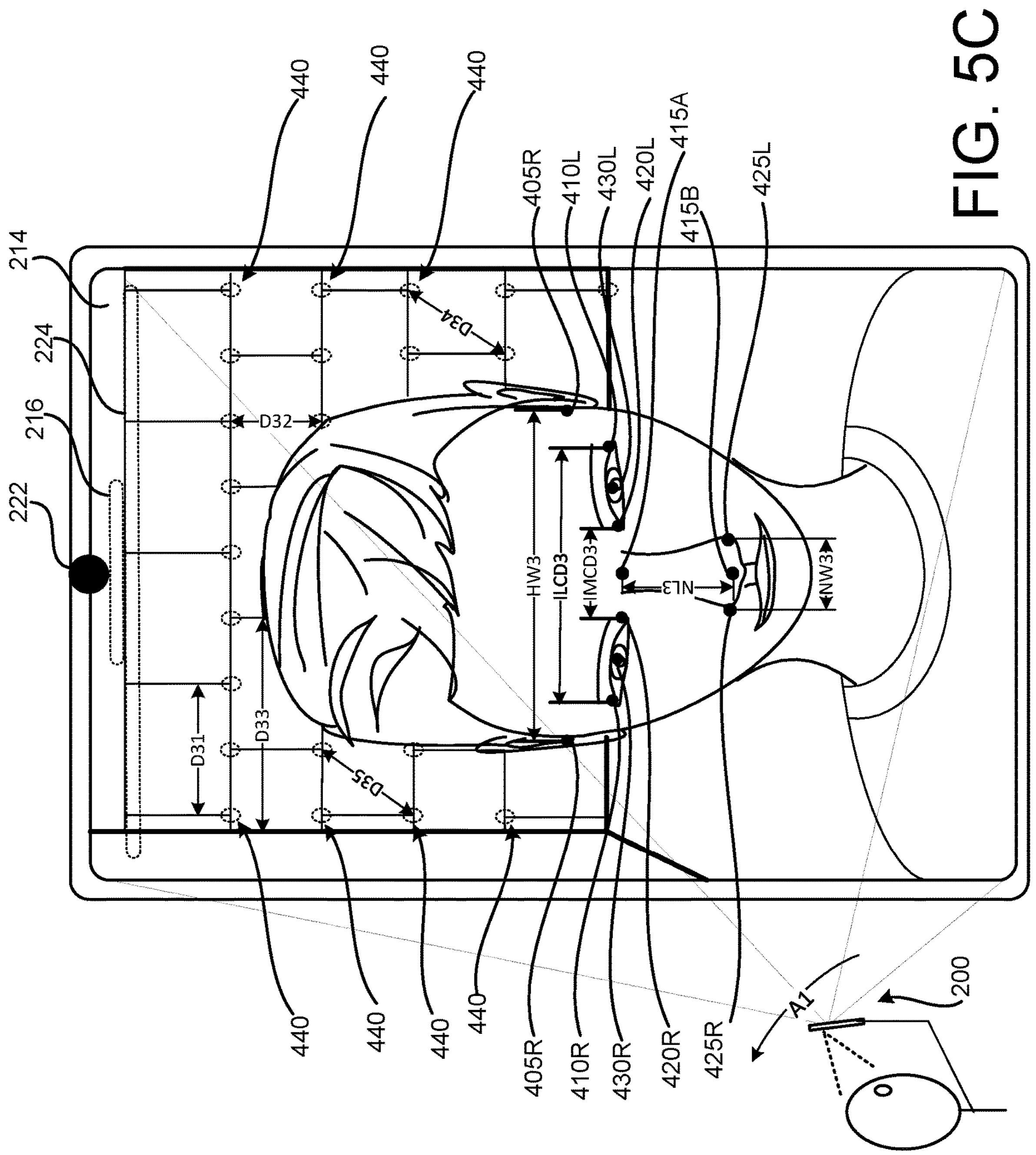

In the positions shown in FIGS. 5B and 5C, the user has moved, for example, sequentially moved, the computing device 200 in the direction of the arrow A1. In the positions shown in FIGS. 5B and 5C, the head and face of the user remain in substantially the same position as shown in FIG. 5A. As the computing device 200 is moved from the position shown in FIG. 5A to the position shown in FIG. 5B and then to the position shown in FIG. 5C, the image sensor 222 captures, for example, sequentially captures, image data of the head and face of the user from the different positions and/or orientations of the computing device 200/image sensor 222 relative to the head and face of the user. FIGS. 5B and 5C show just two example image frames captured by the image sensor 222 as the user moves the computing device 200 in the direction of the arrow A1, while the head and face of the user remain substantially stationary. Any number of image frames may be captured by the image sensor 222 as the computing device 200 is moved in the direction of the arrow A1. Similarly, any number of image frames captured by the image sensor 222 may be analyzed and processed by the recognition engine to detect and/or identify the landmarks 405 and/or the landmarks 410 and/or the landmarks 415 and/or the landmarks 420 and/or the landmarks 425 and/or the landmarks 430 and/or the elements 440 in the image frames captured as the computing device 200 is moved in this manner.

Figure 5D:
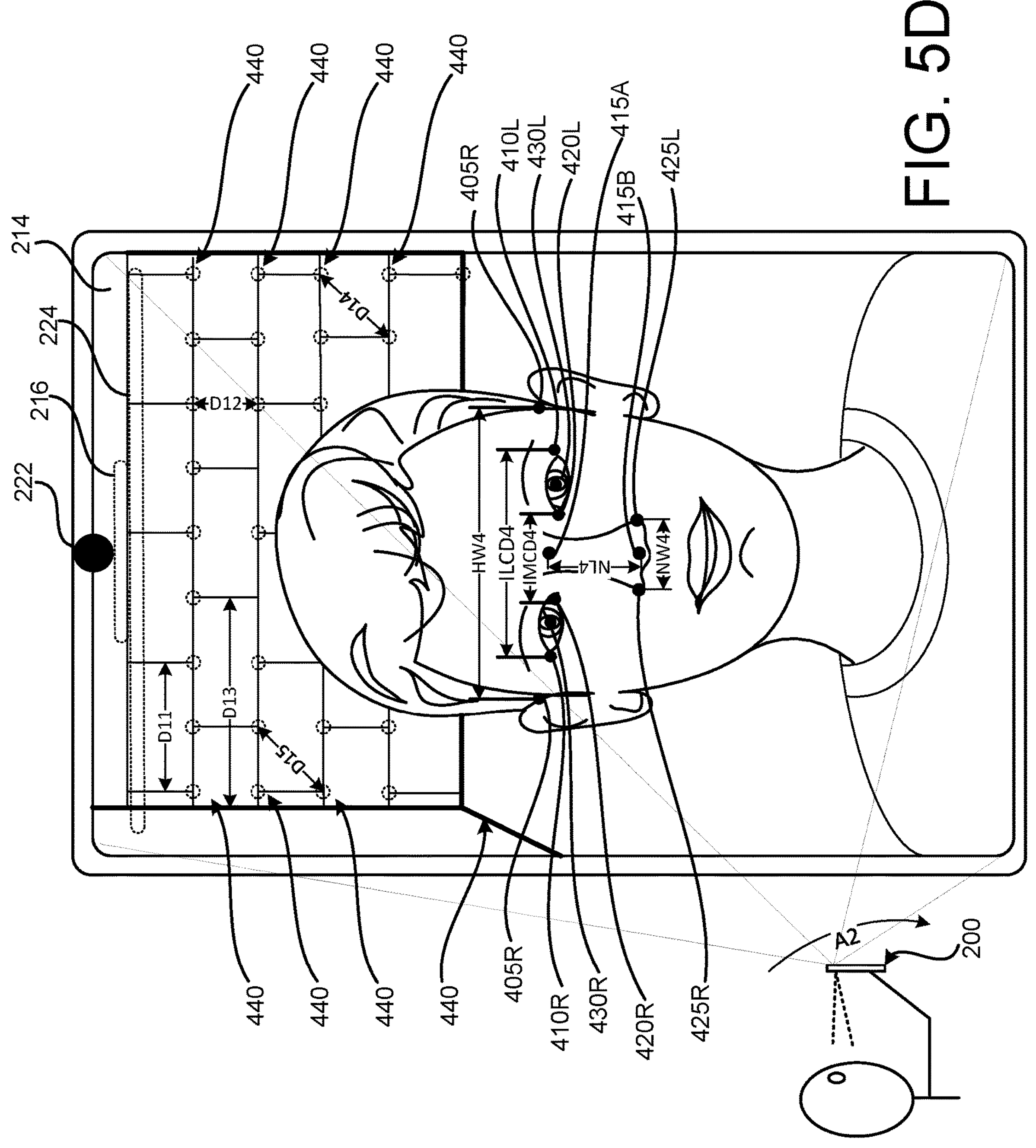
Figure 5E:
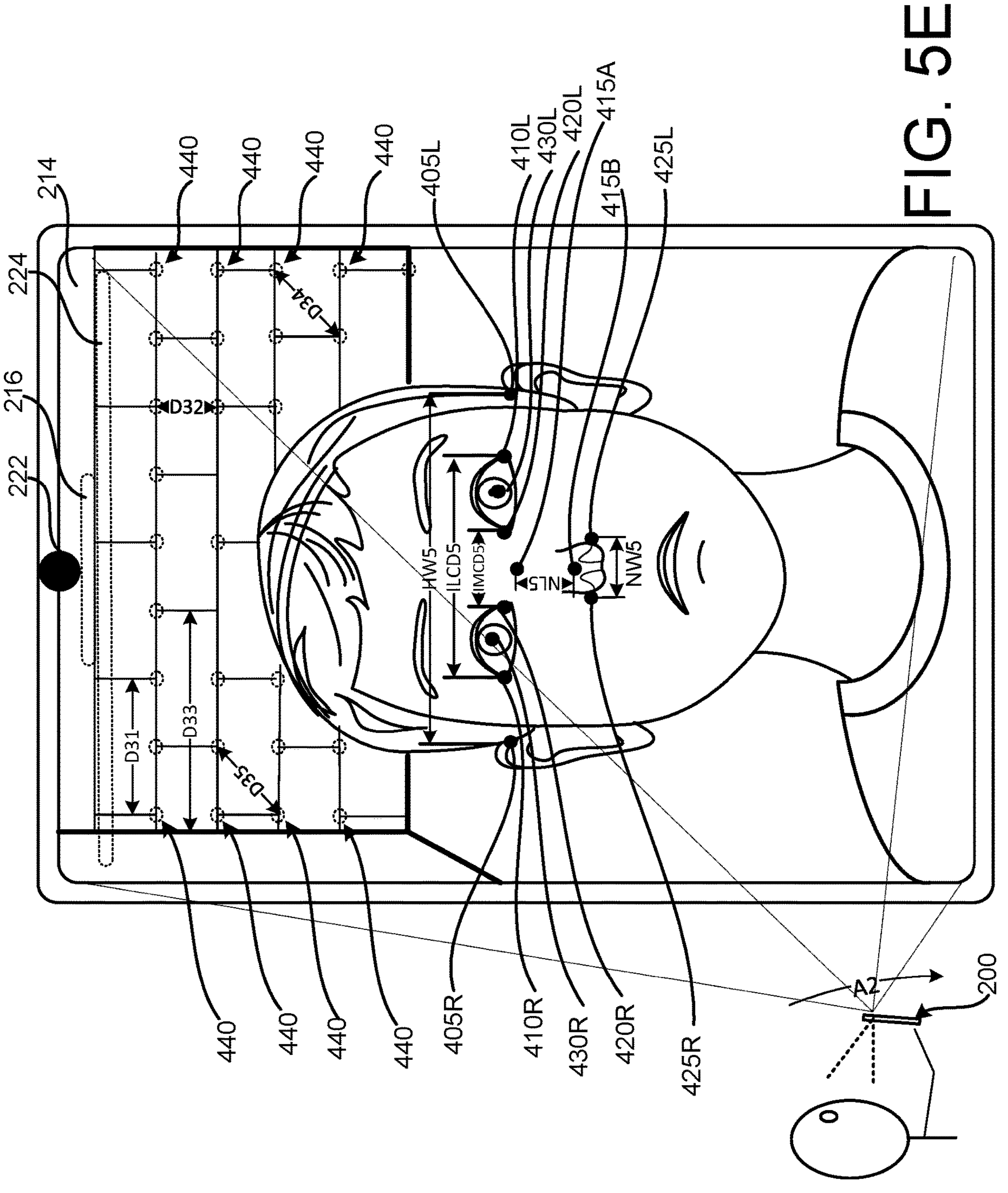
Figure 5F:
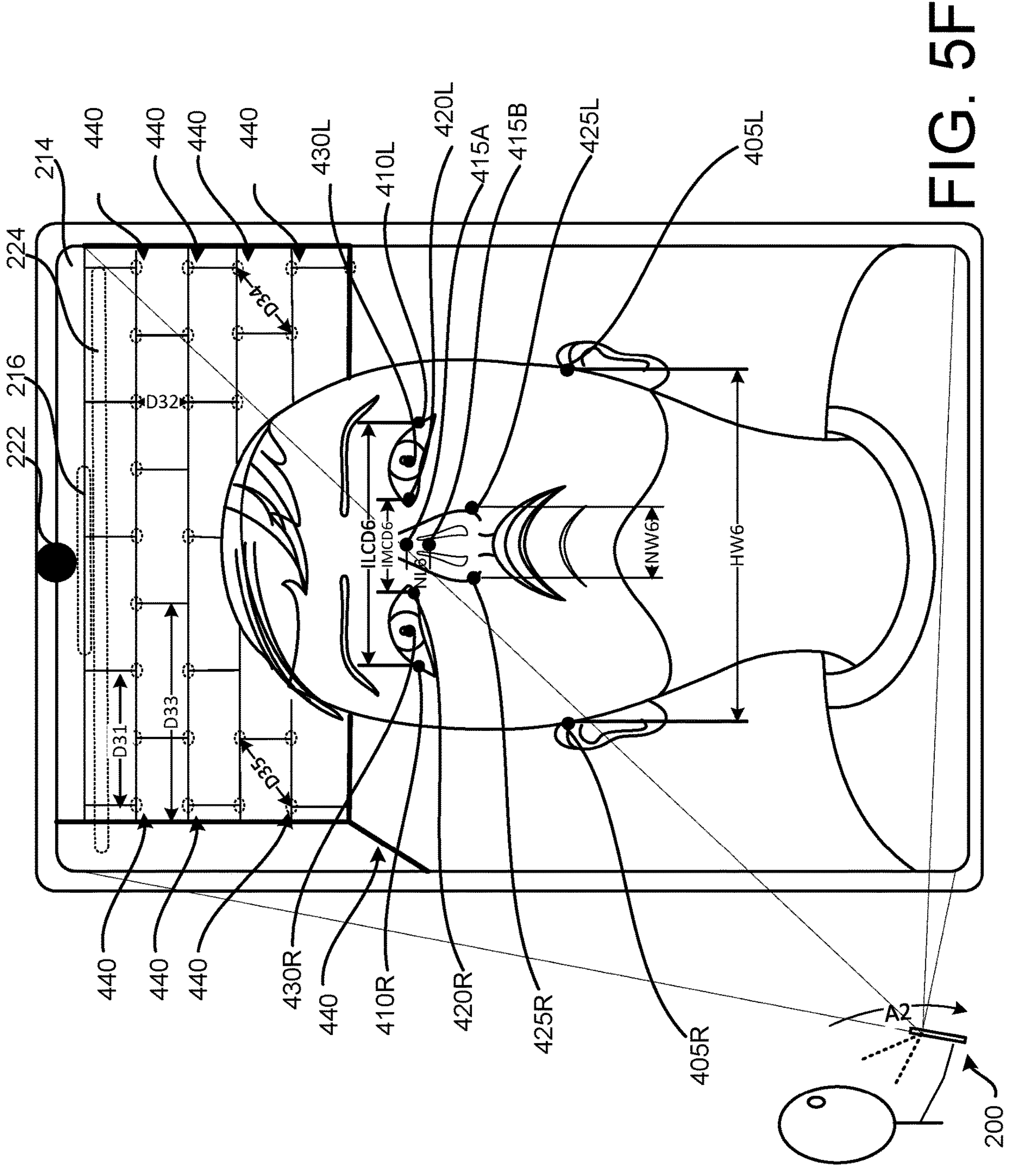

In FIGS. 5D-5F, the computing device 200 has been moved, for example, sequentially moved, in the direction of the arrow A2. In this example, as the computing device 200 is moved in the direction of the arrow A2, the head of the user remains in substantially the same position. As the computing device 200 is moved in the direction of the arrow A2, the image sensor 222 captures image data of the head and face of the user from corresponding perspectives of the computing device 200/image sensor 222 relative to the head and face of the user. Thus, as the computing device 200 is moved in the direction of the arrow A1, and then in the direction of the arrow A2, the image sensor 222 captures image data including the head and face of the user from the various different perspectives of the computing device 200/image sensor 222 relative to the head and face of the user. In this particular example, the position and/or orientation of head and face of the user remain substantially the same. FIGS. 5D-5F show just three example image frames captured by the image sensor 222 as the user moves the computing device 200 in the direction of the arrow A2. Any number of image frames may be captured by the image sensor 222 as the computing device 200 is moved in the direction of the arrow A2. Similarly, any number of image frames captured by the image sensor 222 may be analyzed and processed by the recognition engine to detect and/or identify the landmarks 405 and/or the landmarks 410 and/or the landmarks 415 and/or the landmarks 420 and/or the landmarks 425 and/or the landmarks 430 and/or the elements 440 in the image frames captured as the computing device 200 is moved in this manner.

FIGS. 6A-6D illustrate the use of a computing device, such as the example handheld computing device 200 shown in FIGS. 1 and 2C, to capture image data. In particular, FIGS. 6A-6D illustrate a second series of movements of the example handheld computing device 200 to capture image data including a second series of image frames capturing a second series of perspectives of the face and/or head of the user. Image data captured in this manner may be used in predicting virtual sizing and/or fitting of a wearable device such as the example head mounted wearable device 100 shown in FIGS. 1, 2A and 2B.

Figure 6A:
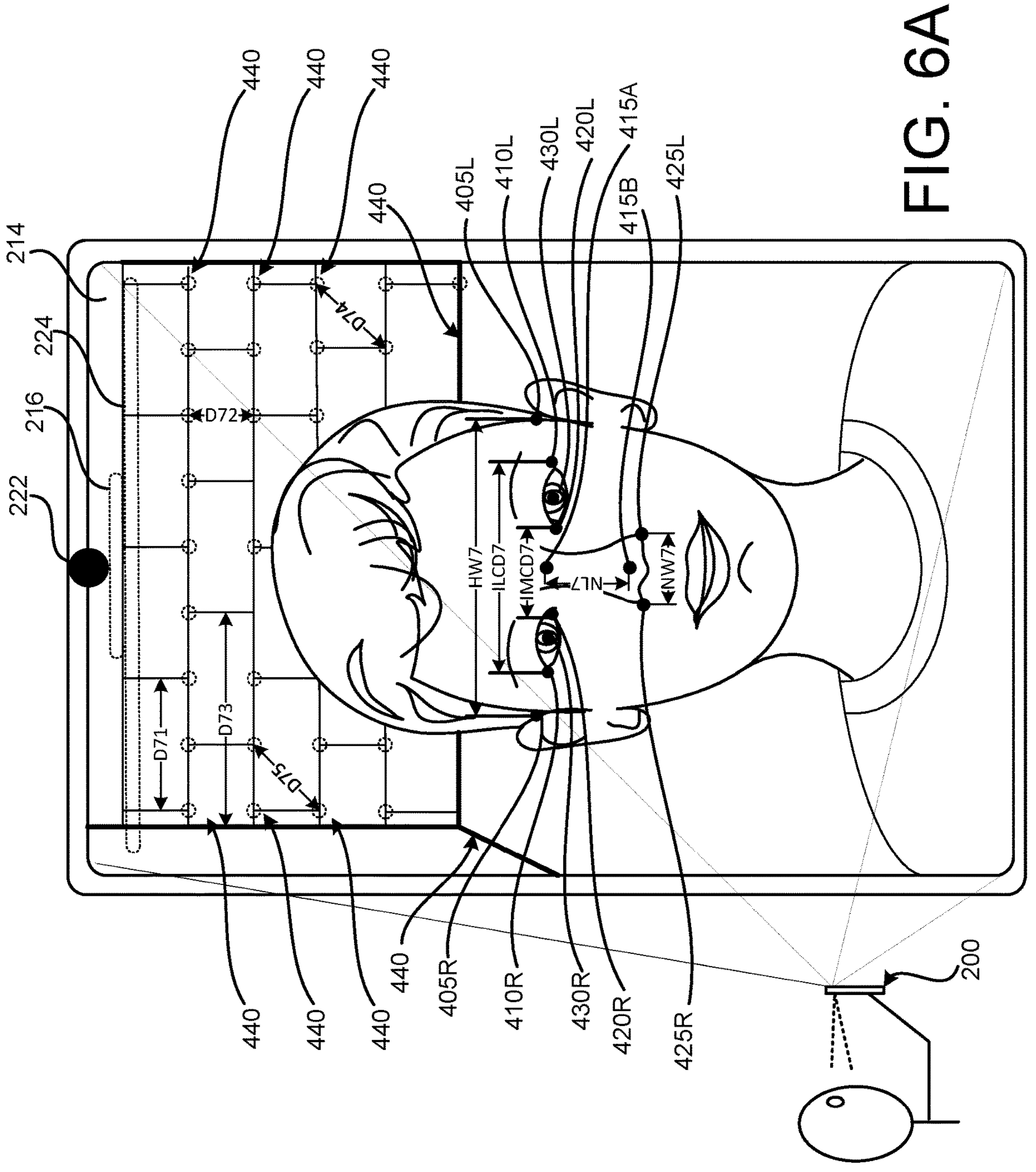
FIGS. 6A-6D illustrate example image data capture using an example computing device.

In the example shown in FIG. 6A, the user has initiated the capture of image data for example, via an application executing on the example handheld computing device 200. In FIG. 6A, the computing device 200 is positioned so that the head and face of the user is captured within the field of view of the image sensor 222. In the example shown in FIG. 6A, the image sensor 222 is included in the front facing camera of the computing device 200, and the head and face of the user are captured within the field of view of the front facing camera of the computing device 200. In the initial position shown in FIG. 6A, the computing device 200 is positioned substantially straight out from the head and face of the user, somewhat horizontally and vertically aligned with the head and face of the user, simply for purposes of discussion and illustration. The capture of image data by the image sensor 222 of the computing device 200 can be initiated at other positions of the computing device 200 relative to the head and face of the user.

Figure 6B:
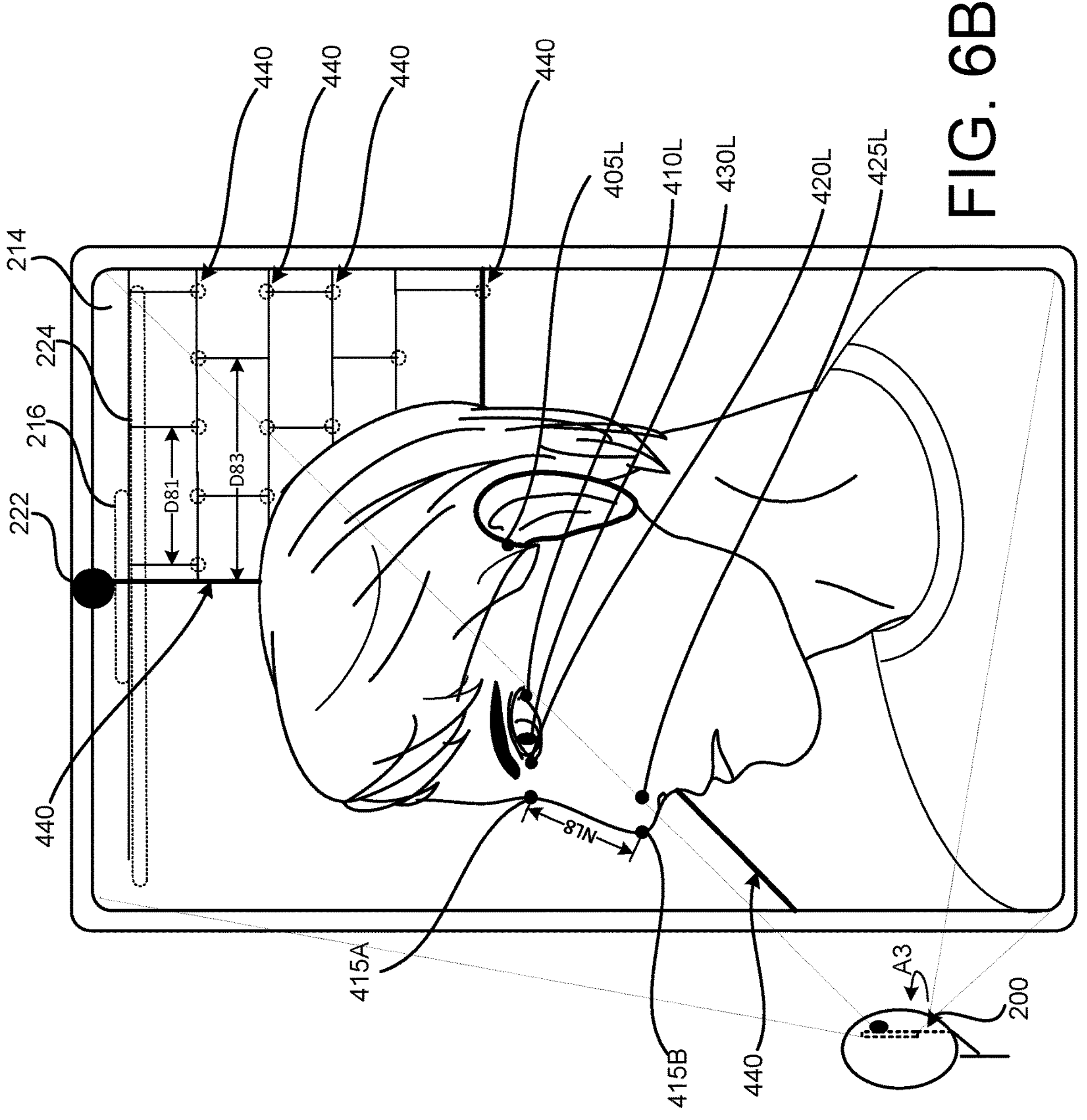

In the positions shown in 6B, the user has moved the computing device 200 in the direction of the arrow A3. In this example, movement of the computing device 200 in the direction of the arrow A3 positions the computing device 200 at the left side of the user, capturing a profile image, or a series of profile perspectives, of the head and face of the user. In the position shown in FIG. 6B, the head and face of the user remain in substantially the same position as shown in FIG. 6A, simply for purposes of discussion and illustration. As the computing device 200 is moved from the position shown in FIG. 6A to the position shown in FIG. 6B, the image sensor 222 captures, for example, sequentially captures, image data of the head and face of the user from the different positions and/or orientations of the computing device 200/image sensor 222 relative to the head and face of the user. FIG. 6B illustrates just one example image frame captured by the image sensor 222 as the user moves the computing device 200 in the direction of the arrow A3, while the head and face of the user remain substantially stationary. Any number of image frames may be captured by the image sensor 222 as the computing device 200 is moved in the direction of the arrow A3. Similarly, any number of image frames captured by the image sensor 222 may be analyzed and processed by the recognition engine to detect and/or identify the landmarks 405 and/or the landmarks 410 and/or the landmarks 415 and/or the landmarks 420 and/or the landmarks 425 and/or the landmarks 430 and/or the elements 440 in the image frames captured as the computing device 200 is moved in this manner.

Figure 6C:
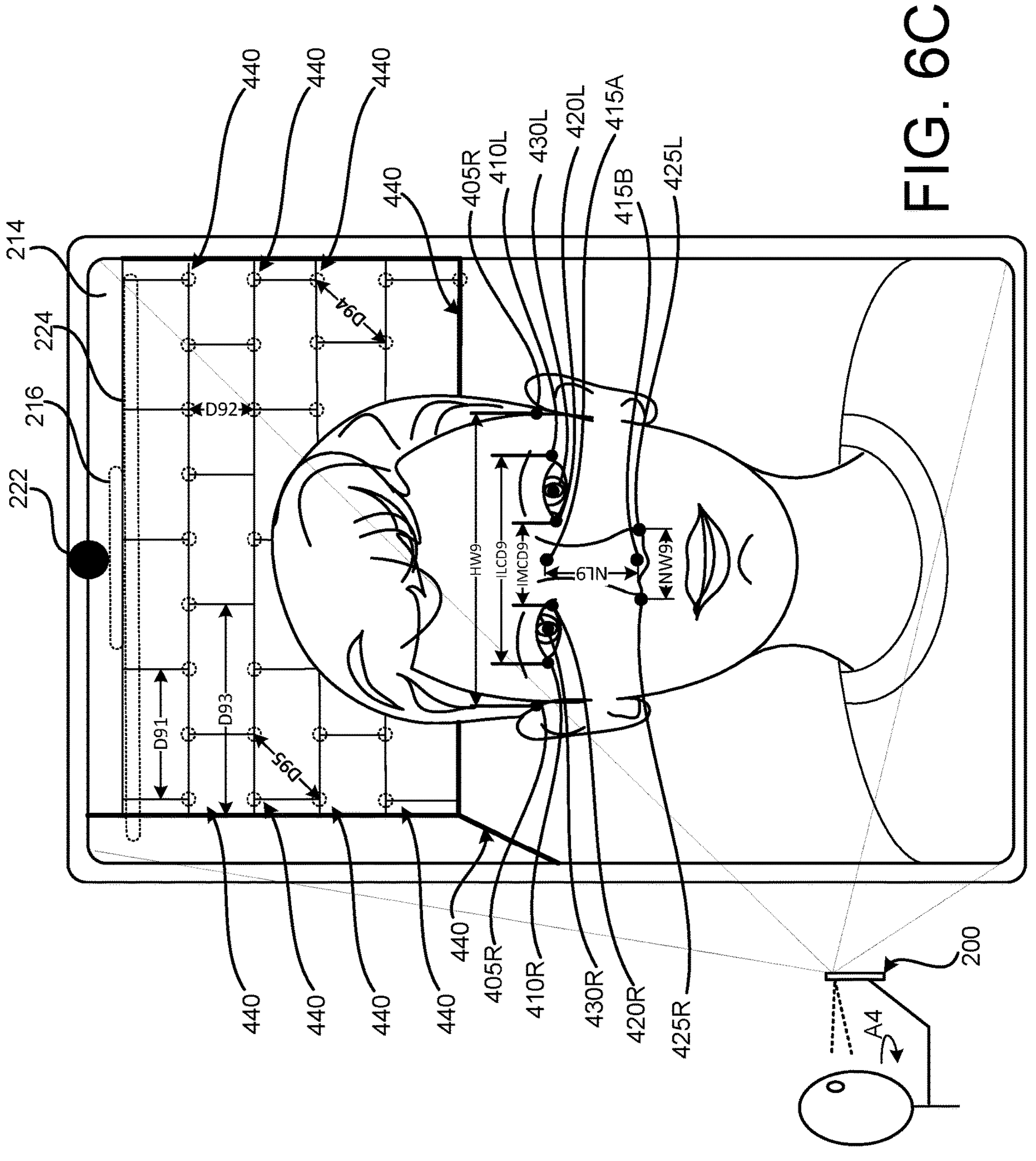
Figure 6D:
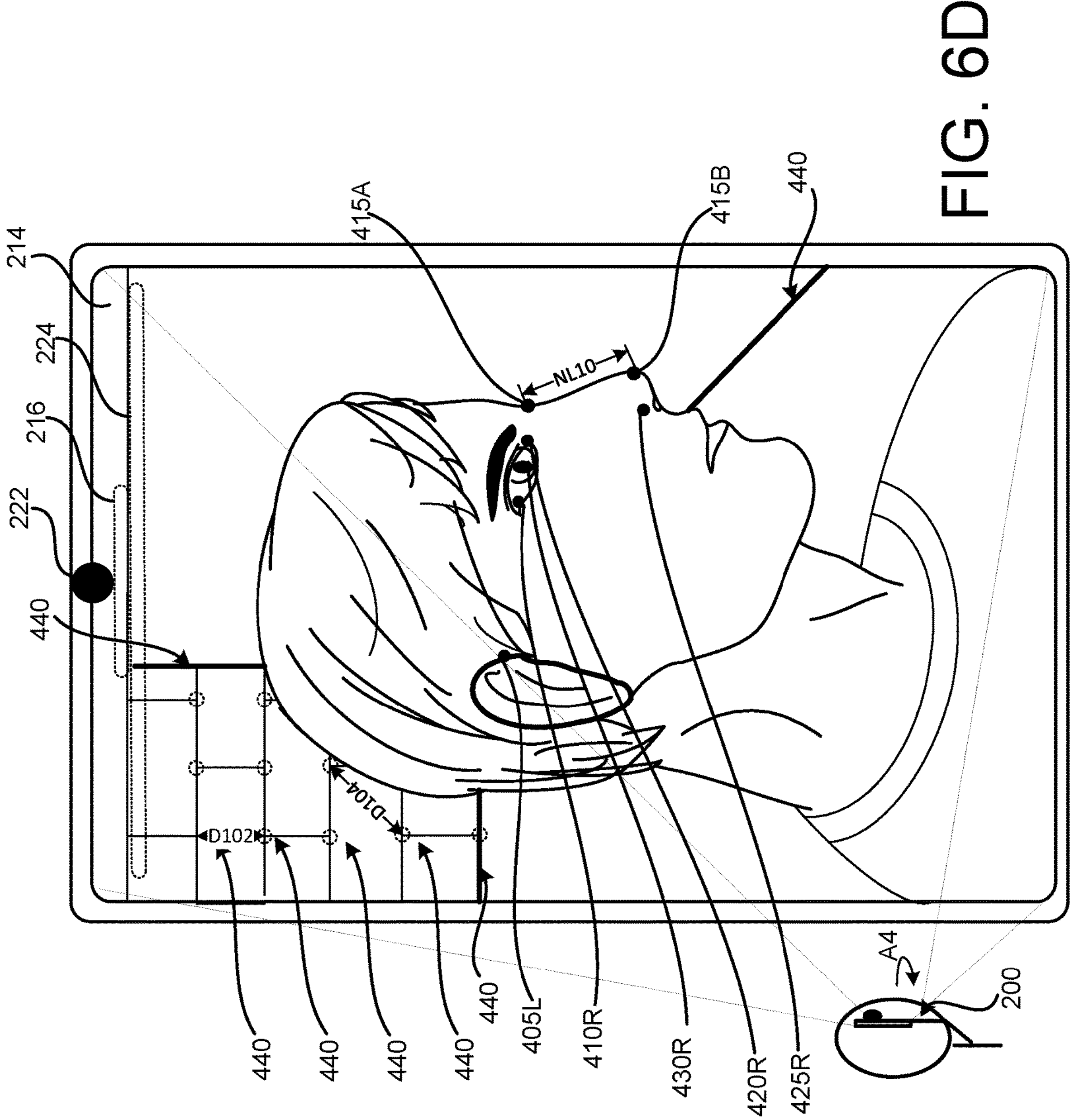

In FIGS. 6C and 6D, the computing device 200 has been moved, for example, sequentially moved, in the direction of the arrow A4, from the position shown in FIG. 6B. In this example, as the computing device 200 is moved in the direction of the arrow A4, the head of the user remains in substantially the same position. In this example, movement of the computing device 200 in the direction of the arrow A4 positions the computing device 200 at the right side of the user, capturing a profile image, or a series of profile images, of the head and face of the user. As the computing device 200 is moved in the direction of the arrow A4, the image sensor 222 captures image data of the head and face of the user from corresponding perspectives of the computing device 200/image sensor 222 relative to the head and face of the user. Thus, as the computing device 200 is moved in the direction of the arrow A3, and then in the direction of the arrow A4, the image sensor 222 captures image data including the head and face of the user from the various different perspectives of the computing device 200/image sensor 222 relative to the head and face of the user. In this particular example, the position and/or orientation of head and face of the user remain substantially the same. Any number of image frames may be captured by the image sensor 222 as the computing device 200 is moved in the direction of the arrow A3 and the arrow A4, in addition to or instead of the example image frames shown in FIGS. 6A-6D. Similarly, any number of image frames captured by the image sensor 222 may be analyzed and processed by the recognition engine to detect and/or identify the landmarks 405 and/or the landmarks 410 and/or the landmarks 415 and/or the landmarks 420 and/or the landmarks 425 and/or the landmarks 430 and/or the elements 440 in the image frames captured as the computing device 200 is moved in this manner.

The image data captured by the image sensor 222 of the computing device 200 as the computing device 200 is moved as shown in FIGS. 5A-5F and/or as shown in FIGS. 6A-6D may be processed, for example, by a recognition engine accessible to the computing device 200 (for example, via the external computing systems 1100 described above with respect to FIG. 1, or via the additional resources 302 described above with respect to FIG. 3). Landmarks and/or features and/or key points and/or elements may be detected in the image data captured by the image sensor 222 through the processing of the image data. In some examples, the detected landmarks and/or features and/or key points and/or elements may be substantially fixed, or substantially unchanging, or substantially constant. The example landmarks 405, 410, 415, 420, 425, 430 and the example elements 440, and measures associated therewith, illustrate just some example landmarks and/or elements that may be detected in the frames of image data captured by the image sensor 222.

As noted above, one example feature or measure may include the head width HW, between the seventh landmark 405R and the eighth landmark 405L representing a head width between the left and right ear saddle points. Another example feature or measure may include the ILCD, representing a distance between the outer corners of the eyes of the user. Another example feature or measure may include the IMCD, representing a distance between the inner corners of the eyes of the user. Another example feature or measure may include the nose length NL. Another example feature or measure may include the nose width NW. In some examples, the facial features or landmarks from which one or more of the HW, the NL, the NW, the ILCD and/or the IMCD are determined may remain substantially constant, even in the event of changes in facial expression, changes in gaze direction, intermittent blinking and the like. As noted above, IPD may remain substantially constant, provided a distance gaze is maintained. Other example landmarks or features may include various fixed elements 440 detected in the background 450, or the area surrounding the head and face of the user. In the example shown in FIGS. 5A-5F and 6A-6D, the fixed elements 440 are geometric features detected in the background 450, or the area surrounding the user, simply for purposes of discussion and illustration. The fixed elements may include other types of elements detected in the background 450. For example, in FIGS. 5A-5F and 6A-6D, the fixed elements 440 are geometric features (lines, edges, corners and the like) detected in a repeating pattern in the background 450, and at the intersections between adjacent walls, at the intersections between the walls and the floor, at the intersections between the walls and the ceiling, and the like, simply for purposes of discussion and illustration. In some examples, other fixed elements, features and the like may be detected in the background, including, for example, features in a room such as windows, frames, furniture, and other elements having defined features that are detectable in the image data captured by the image sensor 222.

These elements having fixed contours and/or geometry in the area surrounding the head and face of the user that may be detected in the frames of image data captured by the image sensor 222. Detected features and/or landmarks, and changes in the frames of image data sequentially captured by the image sensor 222 as the computing device 200 is moved, can be correlated with position and/or orientation data provided by the position and/or orientation sensors included in the IMU 224 of the computing device 200 at positions corresponding to the capture of the image data.

In some examples, data provided by the position and/or orientation sensors included in the IMU 224, together with the processing and analysis of the image data, may be used to provide the user with feedback, to provide for improved collection of image data. In some examples, one or more prompts may be output to the user. These prompts may include, for example, a prompt indicating that the user repeat the image data collection sequence. These prompts may include, for example, a prompt providing further instruction as to the user's motion of the computing device 200 during the image data collection sequence. These types of prompts may provide for the collection of image data from a different perspective that may provide a more complete representation of the head and/or face of the user. These prompts may include, for example, a prompt indicating that a change in the ambient environment may produce improved results such as, for example, a change to include fixed features in the background 450, a change in illumination of the ambient environment, and the like. In some examples, the prompts may be visual prompts output on the display portion 214 of the computing device 200. In some examples, the prompts may be audible prompts output by the audio output device 216 of the computing device 200.

Image data collected in this manner, and/or the fixed landmarks and/or fixed elements detected in the image data, and/or the features of measures associated with the fixed landmarks and/or fixed elements, combined with data provided by position and/or orientation sensors included in the IMU 224 of the computing device 200, may be processed by the one or more processors of the additional resources 302 accessible to the computing device 200 to predict fit of a wearable device, such as the example head mounted wearable device 100.

In particular, the fixed landmarks and/or fixed features detected in the image data and/or associated features and/or measures, combined with the position/orientation data associated with the computing device 200, may be used to extract depth/develop a depth map. In this example, the fixed landmarks and/or fixed elements detected in the image data, combined with data provided by position and/or orientation sensors included in the IMU 224 of the computing device 200, may be processed by the one or more processors of the additional resources 302 accessible to the computing device 200 to develop one or more depth maps of the face and/or head of the user. In some examples, the depth map(s) may be processed by the one or more processors of the additional resources 302 to develop a three-dimensional mesh, or a three-dimensional model, of the face and/or head of the user. A simulation module, or a simulation engine, may process the three-dimensional mesh, or three-dimensional model, of the face/head of the user to fit the head mounted wearable device 100 on the three-dimensional mesh or model, and predict fit of the head mounted wearable device 100 on the user.

In some examples, a metric scale may be applied to determine one or more facial and/or cranial and/or ophthalmic measurements associated with the detected landmarks and/or features (for example, HW and/or NL and/or NW and/or IPD and/or IMCD and/or ILCD and/or HW and the like, as described in the example above, and/or other such measures). The determined one or more facial and/or cranial and/or ophthalmic measurements may be processed by, for example, a machine learning algorithm, to predict fit of the head mounted wearable device 100 on the user. In some examples, metric scale may be provided by, for example, an object having a known scale captured in the image data, by entry of scale parameters by the user, and the like. In some examples, in which metric scale is not otherwise provided, the data associated with the detected landmarks/features/elements and the position/orientation data associated with the computing device 200 may be aggregated by algorithms executed by the one or more processors to determine scale.

The image data captured in the manner described above, when processed by one or more fitting and/or sizing and/or simulation engines and/or modules, may provide for the prediction of fit of a wearable device, such as the head mounted wearable device 100 described above, using the computing device 200 operated by the user, without the use of specialized equipment such as a depth sensor, a pupilometer and the like, without the use of a reference object having a known scale, without access to a retail establishment, and without a proctor to supervise the capture of the image data and/or to capture the image data. Rather, the image data may be captured by the image sensor 222 of the computing device 200 operated by the user, and in particular, by the image sensor 222 included in the front facing camera of the computing device 200.

As noted above, in some examples, one or more depth maps of the face/head of the user may be generated based on a series of image frames including image data captured from different positions of the computing device 200 relative to the head and/or face of the user. The fixed landmarks and/or features and/or elements detected in the image data obtained in this manner may be tracked, and correlated with data provided by position and/or orientation sensors included in the IMU 224 of the computing device 200 to generate the one or more depth maps used to determine fit of the head mounted wearable device 100. In some examples, depth maps generated in this manner may be fused to generate a three-dimensional mesh, or a three-dimensional model, of the face/head of the user. In some examples, the fixed landmarks and/or features and/or elements detected in the image data obtained in this manner may be tracked, and correlated with data provided by position and/or orientation sensors included in the IMU 224 of the computing device 200, to determine metric scale (in a situation in which known scale is not otherwise provided).

In some examples, the frames of image data collected in this manner may be analyzed and processed, for example, by object and/or pattern recognition engines provided in the additional resources 302 accessible to the computing device 200, to detect the fixed landmarks and/or elements in the sequentially captured image frames. Data provided by the position and/or orientation sensors of the IMU 224 may be associated with the detected landmarks and/or elements in the sequential frames of image data. In some examples, changes in the measures associated with the fixed landmarks and/or elements, from image frame to image frame as the position and/or orientation of the computing device relative to the head/face of the user is changed and the sequential image frames are captured, may be associated with the data provisioned by the position and/or orientation sensors of the IMU 224.

This combined data may be aggregated, for example, by one or more algorithms applied by a data aggregating engine of the additional resources 302, to develop a one or more associated depth maps. In some examples, the depth map(s) may be fused to generate the three-dimensional mesh of the face/head of the user. In an example in which metric scale is not otherwise provided, the data aggregating engine may aggregate this data to associate changes in pixel distance (based on analysis of the sequential frames of image data) with changes in position/orientation data of the computing device 200 to generate an estimate of metric scale.

For example, a head width HW1 (based on the fixed facial landmarks 405R, 405L), a nose length NL1 (based on the fixed facial landmarks 415A, 415B), a nose width NW1 (based on the fixed landmarks 425R, 425L), an ILCD1 (based on the fixed facial landmarks 410R, 410L), and an IMCD1 (based on the fixed facial landmarks 420R, 420L), is associated with the first position shown in FIG. 5A. Similarly, a particular position is associated with each of the detected fixed elements 440 in the background 450, and relative positions of the plurality of fixed elements 440 in the background. This is represented in FIG. 5A, simply for illustrative purposes, by a distance D11 between a first pair of the fixed elements 440, a distance D12 between a second pair of the fixed elements 440, a distance D13 between a third pair of the fixed elements 440, a distance D14 between a fourth pair of the fixed elements 440, and a distance D15 between a fifth pair of the fixed elements 440. A first position and a first orientation may be associated with the computing device 200, corresponding to the first position shown in FIG. 5A, based on data provided by the IMU 224. The position and orientation of the computing device 200 at the first position shown in FIG. 5A may in turn be associated with the facial landmarks 405R, 405L and the associated HW1, the facial landmarks 410R, 410L and the associated ILCD1, the facial landmarks 415A, 415B and the associated NL1, the facial landmarks 420R, 420L and the associated IMCD1, the facial landmarks 425R, 425L and associated NW1, and with the plurality of fixed elements 440 and the associated distances D11, D12, D13, D13 and D15.

As the computing device is moved from the first position shown in FIG. 5A to the second position shown in FIG. 5B, a second position and a second orientation of the computing device 200 are associated with the computing device 200 based on data provided by the IMU 224. A motion stereo baseline can be determined based on the first position and first orientation, and the second position and second orientation of the computing device 200, together with the changes in position and/or orientation of the fixed landmarks and/or elements and associated measures. As the computing device 200 is moved relative to the head and face of the user from the first position shown in FIG. 5A to the second position shown in FIG. 5B, the image data captured by the image sensor 222 changes, so that the respective positions of the landmarks 405R, 405L, 410R, 410L, 415A, 415B, 420R, 420L, 425R, 425L and elements 440 change within the image frame. This in turn causes a change from the HW1, ILCD1, NL1, IMCD1, and NW1 shown in FIG. 5A to the HW2, ILCD2, NL2, NW2, ILMD2, and NW2 shown in FIG. 5B. Similarly, this causes a change in the example distances associated with the example pairs of elements 440, from D11, D12, D13, D14 and D15 shown in FIG. 5A, to D21, D22, D23, D24 and D25 shown in FIG. 5B.

In FIG. 5B, the relative second positions of the landmarks 405R, 405L, 410R, 410L, 415A, 415B, 420R, 420L, 425R, 425L and elements 440 (and corresponding distances HW2, ILCD2, NL2, NW2, ILMD2, NW2, D21, D22, D23, D24 and D25) can be correlated with the corresponding movement of the computing device 200 from the first position and first orientation to the second position and second orientation. That is, the known change in position and orientation of the computing device 200, from the first position/orientation to the second position/orientation, may be correlated with a known amount of linear rotation (for example, based on gyroscope data from the IMU 224) and linear acceleration (for example, from accelerometer data from the IMU 224). Thus, the detected change in position of the landmarks 405R, 405L, 410R, 410L, 415A, 415B, 420R, 420L, 425R, 425L and elements 440 (and corresponding distances HW2, ILCD2, NL2, NW2, ILMD2, NW2, D21, D22, D23, D24 and D25) may be determined, using the detected known change in position and orientation of the computing device 200 together with an associated scale value. This data may provide a first reference source for the development of a depth map for the corresponding portion of the head/face of the user captured in the corresponding image frames.

Additional data may be obtained as the user continues to move the computing device 200 further in the direction of the arrow A1, i.e., substantially vertically in this example, from the second position and second orientation shown in FIG. 5B to the third position and third orientation shown in FIG. 5C, while the head remains substantially still. As the computing device 200 is moved relative to the head and face of the user from the second position shown in FIG. 5B to the third position shown in FIG. 5C, image data captured by the image sensor 222 changes, so that the respective positions of the landmarks 405R, 405L, 410R, 410L, 415A, 415B, 420R, 420L, 425R, 425L and elements 440 change within the image frame. This in turn causes a change from the HW2, ILCD2, NL2, IMCD2, and NW2 shown in FIG. 5B to the HW3, ILCD3, NL3, IMCD3, and NW3 shown in FIG. 5C. Similarly, this causes a change in the example distances associated with the example pairs of elements 440, from D21, D22, D23, D24 and D25 shown in FIG. 5B to D31, D32, D33, D34 and D35 shown in FIG. 5C.

The relative third positions of the landmarks 405R, 405L, 410R, 410L, 415A, 415B, 420R, 420L, 425R, 425L and elements 440 (and corresponding distances HW3, ILCD3, NL3, IMCD3, NW3, D31, D32, D33, D34 and D35) can be correlated with the corresponding movement of the computing device 200. That is, the known change in position and orientation of the computing device 200, from the second position/orientation to the third position/orientation, based on a known amount of linear rotation (for example, based on gyroscope data from the IMU 224) and linear acceleration (for example, from accelerometer data from the IMU) may provide another reference source for the development of depth map(s) for corresponding portion(s) of the head/face of the user (as well as a reference source for scale, if scale is not otherwise provided and is to be determined). The detected change in position of the landmarks 405R, 405L, 410R, 410L, 415A, 415B, 420R, 420L, 425R, 425L and elements 440 (and corresponding distances HW3, ILCD3, NL3, IMCD3, NW3, D31, D32, D33, D34 and D35) may be determined, using the detected known change in position and orientation of the computing device 200, as a baseline for the development of a second depth map for the corresponding portion of the head/face of the user captured in the corresponding image frames.

Data may continue to be obtained as the user continues to move the computing device 200. In this example, the user changes direction, and moves the computing device 200 in the direction of the arrow A2, as shown in FIGS. 5D, 5E and 5F, substantially vertically in this particular example, from the third position and third orientation shown in FIG. 5C to an example fourth position/orientation shown in FIG. 5D, an example fifth position/orientation shown in FIG. 5E, and an example sixth position/orientation shown in FIG. 5F, while the head remains substantially still. As the computing device 200 is moved relative to the head and face of the user as shown in FIGS. 5D-5F, image data captured by the image sensor 222 changes, so that the respective positions of the landmarks 405R, 405L, 410R, 410L, 415A, 415B, 420R, 420L, 425R, 425L and elements 440 change within the image frame. This in turn causes a sequential change from the HW3, ILCD3, NL3, IMCD3, NW3 shown in FIG. 5C, to the HW4/ILCD4/NL4/IMCD4/NW4, HW5/ILCD5/NL5/IMCD5/NW5, and HW6/ILCD6/NL6/IMCD6/NW6 shown in FIGS. 5D-5F, respectively. Similarly, this causes a sequential change in the example distances associated with the example pairs of elements 440, from D31, D32, D33, D34 and D35 shown in FIG. 5C, to D41/D42/D43/D44/D45 shown in FIG. 5D, to D51/D52/D53/D54/D55 shown in FIG. 5E, and to D61/D62/D63/D64/D65 shown in FIG. 5F.

The relative positions of the landmarks 405R, 405L, 410R, 410L, 415A, 415B, 420R, 420L, 425R, 425L and elements 440 (and corresponding distances) can again be correlated with the corresponding movement of the computing device 200, with known positions and orientations of the computing device 200 as the computing device 200 is moved as shown, based on a known amount of linear rotation (for example, based on gyroscope data from the IMU 224) and linear acceleration (for example, from accelerometer data from the IMU. The detected changes in positions of the landmarks 405R, 405L, 410R, 410L, 415A, 415B, 420R, 420L, 425R, 425L and elements 440, and corresponding distances, as the computing device 200 is moved in the direction of the arrow A2 as shown In FIGS. 5D-5F, may be determined, using the detected known changes in position and orientation of the computing device 200. This data may again, be processed by the one or more processors, to develop one or more depth maps corresponding to portions of the face/head of the user captured in the image data of the associated image frames.

As shown in FIGS. 6A-6D, the user may continue to collect image data from which one or more additional depth maps may be developed, to facilitate the development of a three-dimensional mesh, or a three-dimensional model, of the face/head of the user, for the prediction of fit of the head mounted wearable device 100.

For example, as shown in FIG. 6A, as the user initiates the continued collection of image data, a head width HW7 (based on the fixed facial landmarks 405R, 405L), a nose length NL7 (based on the fixed facial landmarks 415A, 415B), a nose width NW7 (based on the fixed landmarks 425R, 425L), an ILCD7 (based on the fixed facial landmarks 410R, 410L), and an IMCD7 (based on the fixed facial landmarks 420R, 420L), is associated with the position shown in FIG. 6A. Similarly, a particular position is associated with each of the detected fixed elements 440 in the background 450, and relative positions of the plurality of fixed elements 440 in the background. This is represented in FIG. 6A, simply for illustrative purposes, by a distance D71 between the first pair of the fixed elements 440, a distance D72 between the second pair of the fixed elements 440, a distance D73 between the third pair of the fixed elements 440, a distance D74 between the fourth pair of the fixed elements 440, and a distance D75 between the fifth pair of the fixed elements 440. A position and orientation may be associated with the computing device 200, corresponding to the position shown in FIG. 6A, based on data provided by the IMU 224. The position and orientation of the computing device 200 at the position shown in FIG. 6A may in turn be associated with the facial landmarks 405R, 405L and the associated HW7, the facial landmarks 410R, 410L and the associated ILCD7, the facial landmarks 415A, 415B and the associated NL7, the facial landmarks 420R, 420L and the associated IMCD7, the facial landmarks 425R, 425L and associated nose width NW7, and with the plurality of fixed elements 440 captured in the background 450 and the associated distances D71, D72, D73, D73 and D75.

As the computing device is moved in the direction of the arrow A3, from the seventh position shown in FIG. 6A to an eighth position shown in FIG. 6B, an eighth position and orientation of the computing device 200 are associated with the computing device 200 based on data provided by the IMU 224. As the computing device 200 is moved relative to the head and face of the user from the seventh position shown in FIG. 6A to the eighth position shown in FIG. 6B, the image data captured by the image sensor 222 changes, so that the respective positions of the fixed facial landmarks and fixed elements in the background 450 change within the image frame. In this example, some of the fixed facial features, and fixed elements in the background, that were visible/detectable in the seventh position shown in FIG. 6A, are no longer visible/detectable in the eighth position shown in FIG. 6B, due to the change in position of the computing device 200 relative to the face/head of the user. In this example, based on the detectable facial features and/or elements, a nose length NL8 is determined (based on the detection of the facial landmarks 415A, 415B), and D81 and D83 are determined (based on the detection of the corresponding fixed elements 440 in the background 450). The change in position and/or orientation of the computing device 200 relative to the face/head of the user in turn causes a change from the NL7 shown in FIG. 6A to the NL8 shown in FIG. 6B. Similarly, this causes a change in the example distances associated with the example pairs of elements 440, from the distances D71 and D73 shown in FIG. 6A to the distances D81 and D83 shown in FIG. 6B.

The relative change in measures and/or distances, i.e., the change from the NL7, D71, and D73 shown in FIG. 6A to the NL8, D81 and D83 shown in FIG. 6B, can be correlated with the corresponding movement of the computing device 200 from the seventh position and orientation to the eighth position and second orientation. That is, the known change in position and orientation of the computing device 200, from the seventh position/orientation to the eighth position/orientation, may be correlated with a known amount of linear rotation (for example, based on gyroscope data from the IMU 224) and linear acceleration (for example, from accelerometer data from the IMU 224). Thus, the detected change in position of the landmarks 415A, 415B and elements 440 (and corresponding distances NL7/NL8, D71/D81, and D73/D83) may be determined, using the detected known change in position and orientation of the computing device 200 together with an associated scale value. This data may provide an additional source for the development of a depth map for the corresponding portion of the head/face of the user captured in the corresponding image frames.

Additional data may be obtained as the user moves the computing device 200 in the direction of the arrow A4, from the eighth position and orientation shown in FIG. 6B to a ninth position and orientation shown in FIG. 6C and a tenth position and orientation shown in FIG. 6D, while the head remains substantially still. As the computing device 200 is moved relative to the head and face of the user from the eighth position shown in FIG. 6B to the ninth and tenths positions shown in FIGS. 6C and 6D, image data captured by the image sensor 222 changes, so that the respective positions of the landmarks 405R, 405L, 410R, 410L, 415A, 415B, 420R, 420L, 425R, 425L and elements 440 change within the image frame.

This in turn causes a sequential change in relative positions of the fixed facial landmarks (and corresponding measures) detected in the image data of the respective image frames, and of the fixed elements 440 (and corresponding distances) detected in the background 450 in the image data of the respective image frames. This includes, for example, a change from the nose length NL7 shown in FIG. 6A, to the nose length NL8 shown in FIG. 6B, to a nose length NL9 shown in FIG. 6C, and a nose length NL10 shown in FIG. 6D. Similarly, this includes, for example, a change from the distances D71, D72, D73, D74, and D75 shown in FIG. 6A, to distances D81 and D83 shown in FIG. 6B, to distances D91, D92, D93, D94, and D95 in FIG. 6C, to distances D102 and D104 in FIG. 6D.

Detection of the fixed landmarks 415A, 415B and associated nose length NL (i.e., NL7, NL8, NL9, NL10), from the image data captured in the sequential image frames shown in FIGS. 6A-6D, may be correlated with corresponding position/orientation data associated with the computing device 200 as it is moved to capture the sequential image frames as shown. Similarly, detection of the fixed landmarks 405R, 405L, 410R, 410L, 420R, 420L and associated head width HW, ILCD, and IMCD (i.e., HW7, ILCD7, and IMCD7 at the seventh position shown in FIG. 6A, and HW9, ILCD9, and IMCD9 at the ninth position shown in FIG. 6C), may be correlated with corresponding position/orientation data associated with the computing device 200 at the seventh and ninth positions shown in FIGS. 6A and 6C. Detection of the fixed elements 440 and associated distances may be similarly correlated with the corresponding position/orientation data associated with the computing device 200 at the respective positions at which the fixed elements associated with the distances are detected. For example, detection of the fixed elements 440 in the background 450 of the image data collected as the computing device 200 and the sequential image frames are captured as shown in FIGS. 6A-6D, may be correlated with the corresponding position/orientation data associated with the computing device 200, to detect changes in distances D71/D81/D91, D72/D92/D102, D73/D83/D93, D74/D94/D104, and D75/D95. Thus, the detected changes in positions of the landmarks 405R, 405L, 410R, 410L, 415A, 415B, 420R, 420L, 425R, 425L and elements 440, and corresponding distances, as the computing device 200 is moved as shown, may be determined, using the detected known changes in position and orientation of the computing device 200. This data may again, be processed by the one or more processors, to develop one or more depth maps corresponding to portions of the face/head of the user captured in the image data of the associated image frames.

The examples shown in FIGS. 5A-5F and 6A-6D describe ten example data collection points, simply for ease of discussion and illustration. In some examples, image data and position and orientation data may be obtained at more, or fewer, points as the computing device 200 is moved. In some examples, image data and position and orientation data may be substantially continuously obtained, with corresponding depth data being substantially continuously determined.

Depth data, detected in this manner, may be aggregated, for example, by a data aggregating engine and associated algorithms available via the additional resources 302 accessible to the computing device 200. The image data, and the associated position and orientation data, may continue to be collected until the aggregated data determined in this manner provides a relatively complete data set for the development of a three-dimensional mesh/three-dimensional model of the face and/or head of the user.

Similarly, in a situation in which metric scale is not otherwise provided, this motion stereo approach may be applied to the determination of scale. Depth data, detected as described above based on comparison of fixed landmarks and/or features and/or elements in sequentially collected image data, combined with position and/or orientation data associated with the computing device 200 as the image data is collected, may be aggregated by, for example, a data aggregating engine and associated algorithms, until the aggregated data produces scale values that coalesce to provide a relatively robust, reliable determination of metric scale.

FIGS. 5A-5F and 6A-6D provide just one example of a manner in which the image data may be captured. In particular, FIGS. 5A-5F and 6A-6D provide just one example of how the image data may be captured by a user operating the computing device 200, without the need for specialized equipment and/or proctoring and/or a physical or virtual appointment with a technician for assistance. Other types of computing devices may be used to obtain the image data, operated in manners other than described in the above example(s).

Figure 7A:
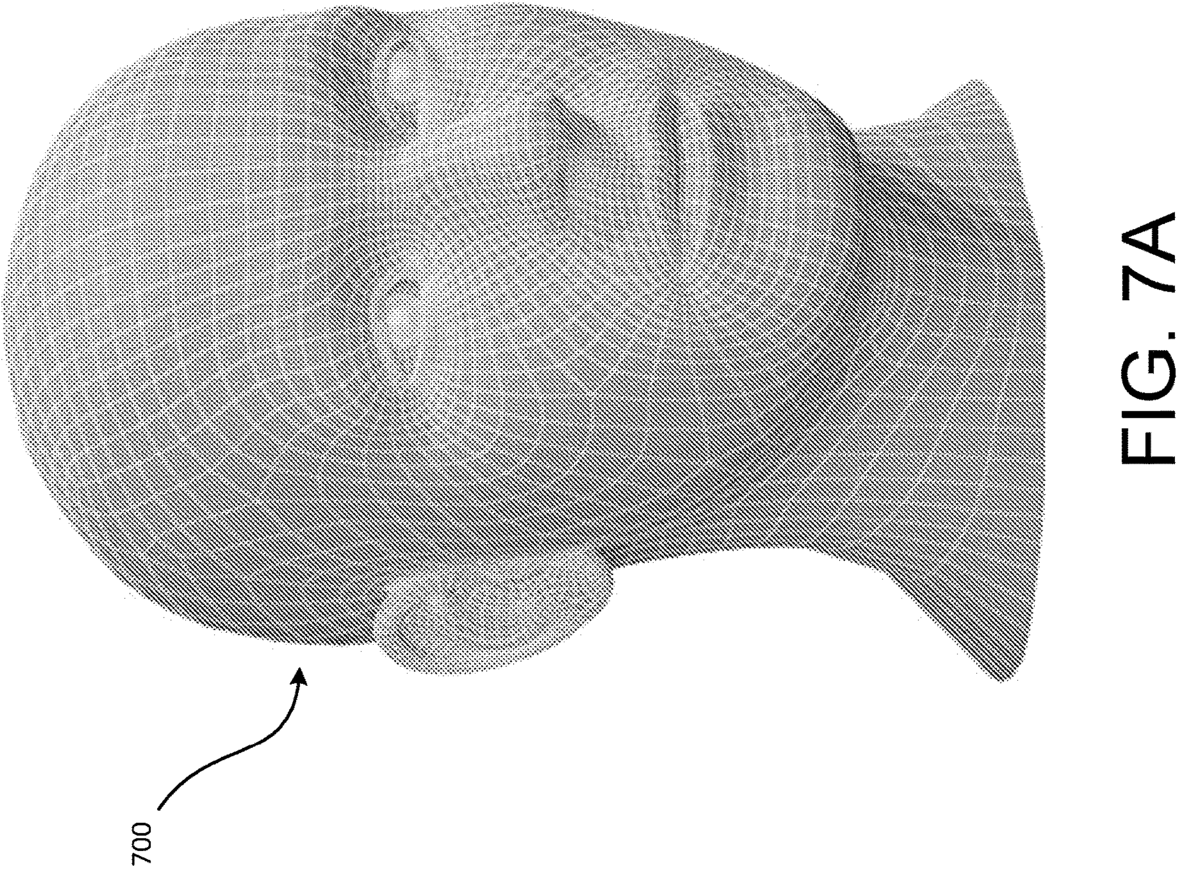
FIGS. 7A-7D illustrate example three-dimensional mesh models of a face and/or head of a user from two-dimensional image data.
Figure 7B:
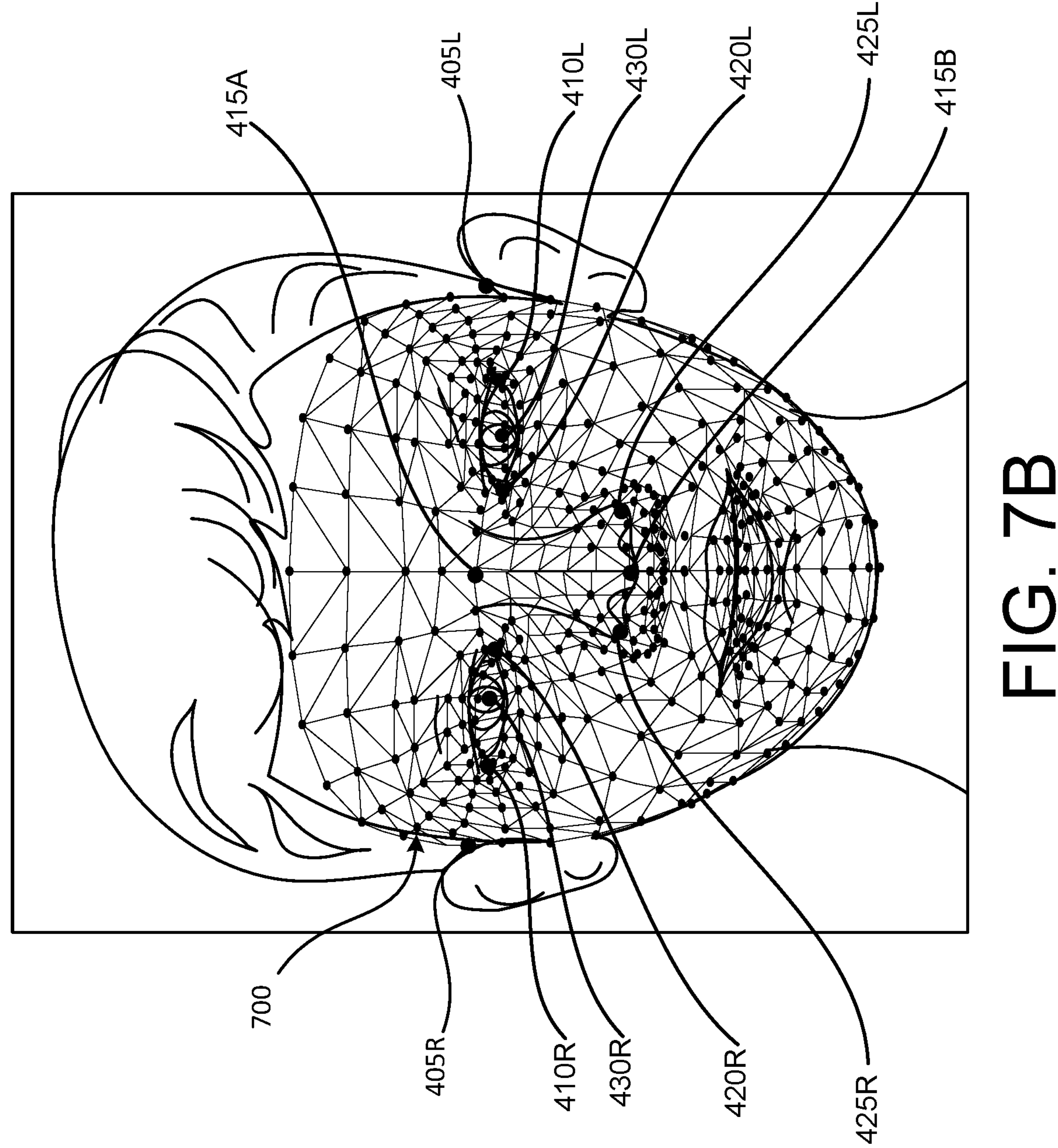

As noted above, the one or more depth maps may be generated from the image data representing the face and/or head of the user from various different perspectives/various different positions and/or orientations of the computing device 200 relative to the face and/or head of the user. In some examples, the depth maps may be fused, or stitched together, to develop a three-dimensional mesh, representative of a three-dimensional model, of the face and/or head of the user. FIG. 7A illustrates a perspective view of an example three-dimensional mesh 700 of a face and head of a user. The example three-dimensional mesh 700 may be generated based on a series of depth maps, developed from two-dimensional image data in a series of image frames as described above, that have been stitched or fused together to generate the three-dimensional mesh 700. FIG. 7B illustrates a portion of the three-dimensional mesh 700, superimposed on the face/head of the user, including the identification of some of the example fixed facial landmarks 405R, 405L, 410R, 410L, 415A, 415B, 420R, 420L, 425R, 425L, 430R, 430L.

In some examples, the three-dimensional mesh 700, or three-dimensional model, may be provided to a simulation engine or a simulation module, to predict a fit of the wearable device (i.e., the head mounted wearable device 100) for the user. In some examples, various metric measurements, including for example, facial and/or cranial and/or ophthalmic measurements, may be extracted from the three-dimensional model for processing in predicting fit. In some examples, these measurements may include one or more of the example head width HW, nose length NL, nose width NW, IPD, IMCD, ILCD, and/or other such measurements that can be derived based on the application of a known or determined metric scale to various fixed facial/cranial/ophthalmic landmarks. In some examples, the various measurements may be used to predict various aspects of fit associated with the head mounted wearable device 100. In some examples, the processing of the three-dimensional mesh 700 or model may predict a wearable fit, representative of how the head mounted wearable device 100 will physically fit on the face/head of the user and be worn by the user. In a situation in which the head mounted wearable device 100 is to include corrective or prescription lenses, this processing and fitting prediction may take into account ophthalmic fit. In a situation in which the head mounted wearable device 100 is to include display capability, this processing and fitting prediction may take into account display fit, so that content output by a display device of the head mounted wearable device 100 is visible to the user.

Figure 7C:
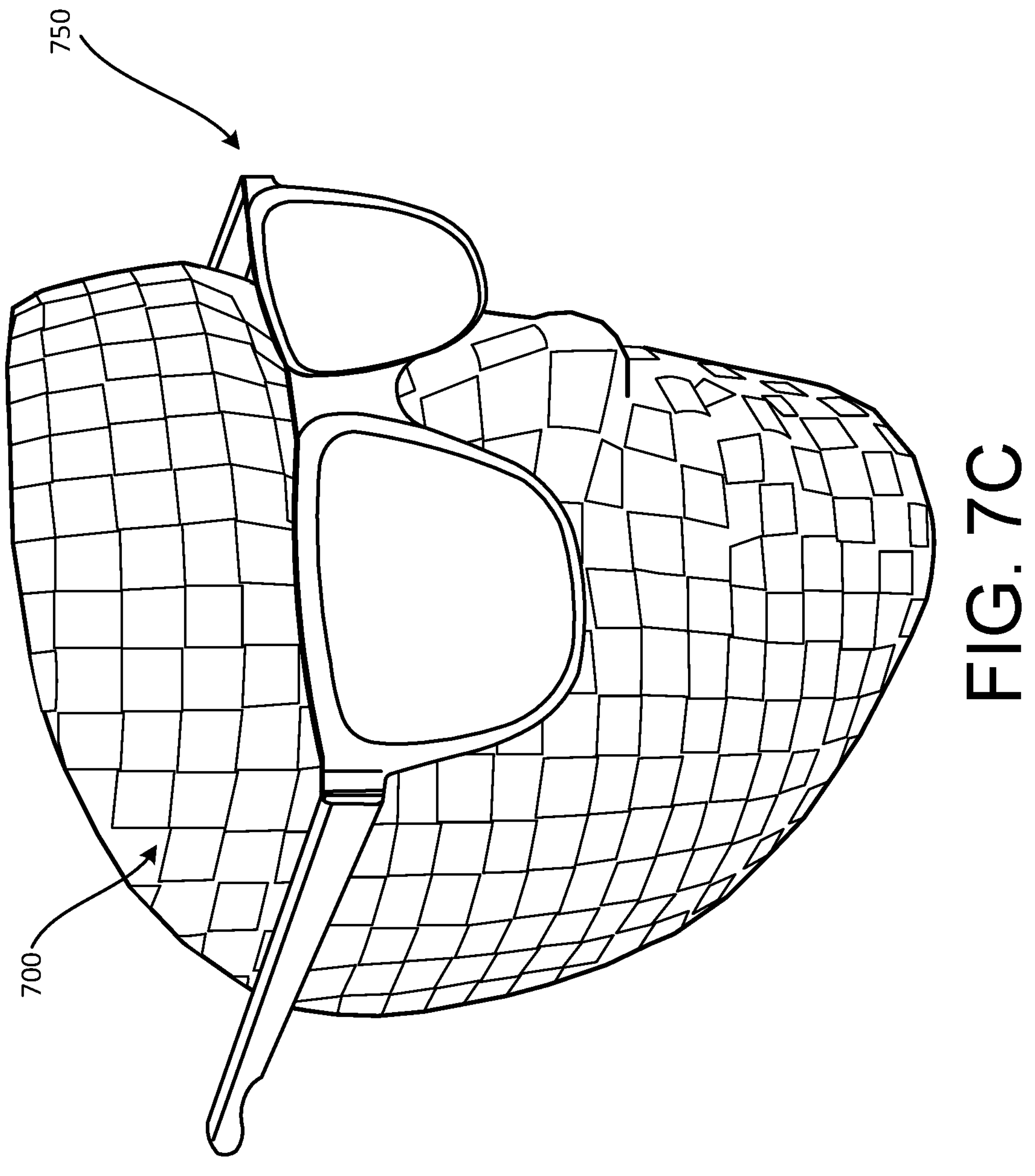
Figure 7D:
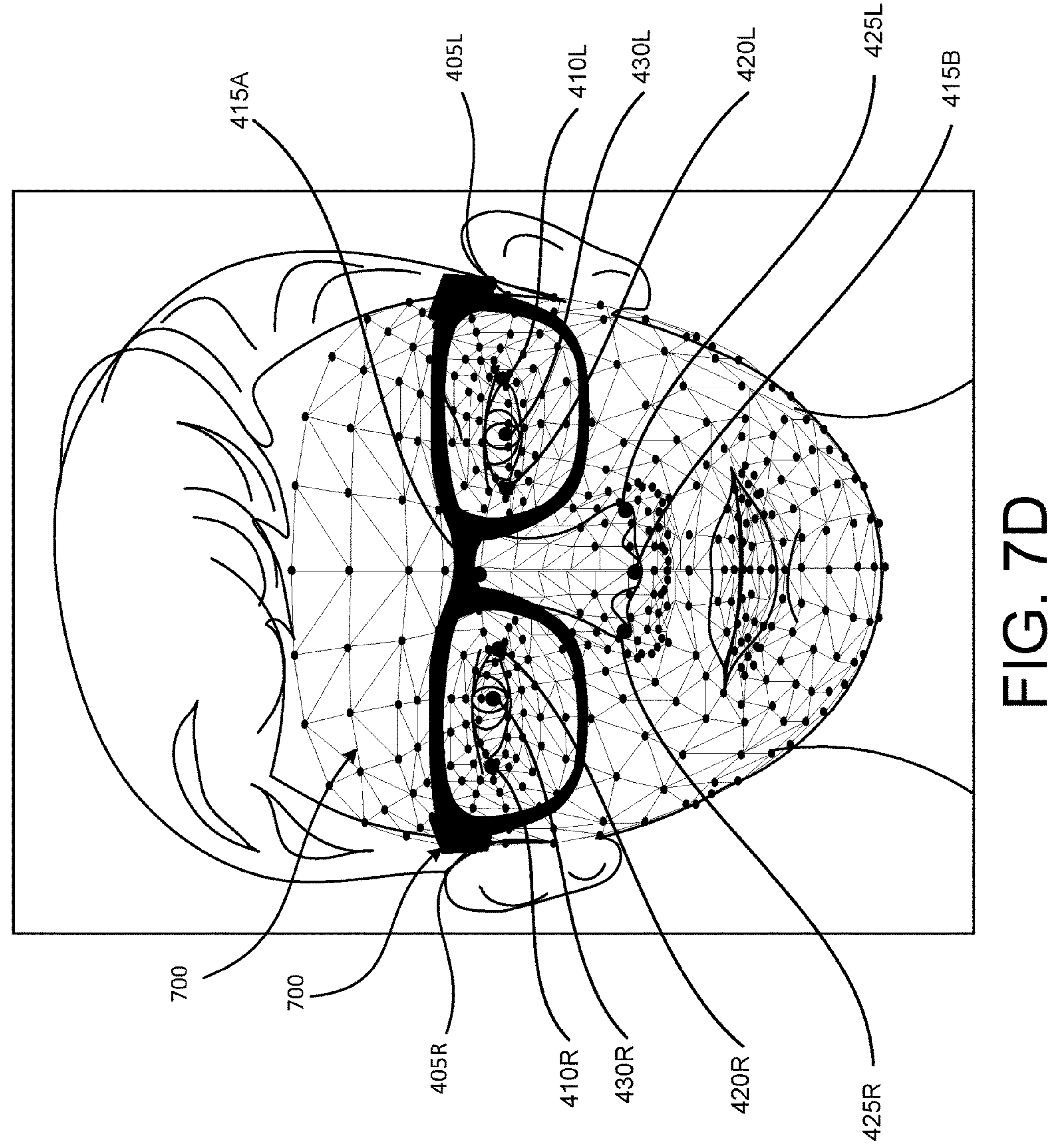

In some examples, one or more facial and/or cranial and/or ophthalmic measurements may be extracted, for example, from the three-dimensional mesh 700, to predict sizing and/or fitting of the head mounted wearable device 100 for the user based on the image data obtained as described above. In some examples, the three-dimensional mesh 700 and/or extracted facial and/or cranial and/or ophthalmic measurements may be provided to a sizing and/or fitting simulator, or simulation engine, or simulation module. In some examples, the sizing and/or fitting simulator may access a database of available head mounted wearable devices and apply a machine learnings model to select one or more head mounted wearable devices, from the available head mounted wearable devices, that are predicted to fit the user based on the three-dimensional mesh 700 and/or the extracted facial/cranial and/or ophthalmic measurements. FIG. 7C illustrates one example head mounted wearable device 750, of a plurality of head mounted wearable devices which may be considered by the simulator and/or the machine learning model, positioned on the three-dimensional mesh 700 of the face/head of the user. FIG. 7D illustrates the one example head mounted wearable device 750 positioned on the three-dimensional mesh 700, with the three-dimensional mesh 700 superimposed on the face of the user. In some examples, the simulator implementing the machine learning model may access a fit database including fit data for each of the plurality of available head mounted wearable devices. Fit scores, accumulated across a relatively large pool of users, may be accessed to provide an indication and prediction of fit for the user, based on one or more of the measurements extracted from the three-dimensional mesh 700. The database accessed by the machine learning model may include, for example, a distribution of scoring frequency for each of the plurality of available head mounted wearable devices for a range of head widths, a range of nose widths, a range of nose lengths, a range of ILCDs and/or IMCDs, and the like. These scores may be taken into consideration by the machine learning model in predicting fit for a head mounted wearable device for the user.

Figure 8:
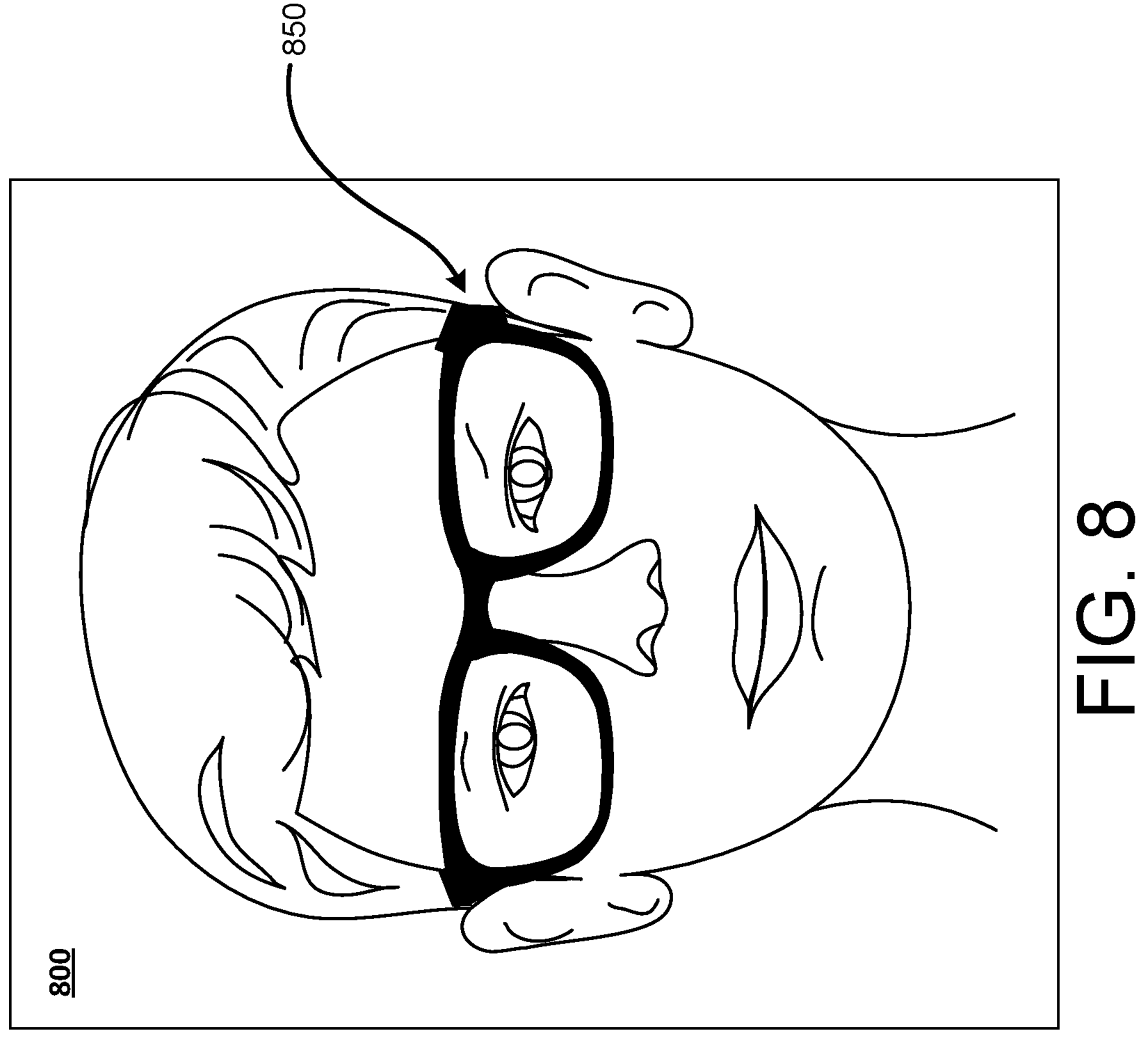
FIG. 8 illustrates an example fitting image.

In some examples, the one or more head mounted wearable devices, predicted by the simulator implementing the machine learning model to be a fit for the user, may be presented to the user, for virtual try on, comparison, and the like prior to purchase. In some examples, the simulator implementing the machine learning model may predict whether a head mounted wearable that has already been selected by the user will fit the user. In some examples, the simulator may provide a fitting image 800 to the user, as shown in FIG. 8. The fitting image 800 may provide a visual indication during the virtual try on, representative of how a selected head mounted wearable device 850 will look on the face and/or head of the user.

Systems and methods, in accordance with implementations described herein, may provide a prediction of fit of the head mounted wearable device 100 for the user based on image data, obtained by the user operating the computing device 200, combined with position and/or orientation data provided by one or more sensors of the computing device 200. In the examples described above, image data of the head and face of the user is obtained by the image sensor 222 of a front facing camera of the computing device 200. In some situations, the collection of image data in this manner may pose challenges due to, for example, the relative proximity between the image sensor 222 of the front facing camera and the head/face of the user, inherent, natural movement of the head and face of the user as the computing device 200 is moved, combined with the need for accuracy in the fitting of head mounted wearable devices. The use of static key points, or elements, or features, in the background that anchor the captured image data as the computing device 200 is moved and sequential frames of image data are captured, may increase the accuracy of the depth data derived from the image data and position/orientation data, and the subsequent three-dimensional mesh, and the fitting of the head mounted wearable device fitted based on the three-dimensional mesh and/or extracted facial/cranial/ophthalmic measurements. The collection of multiple frames of image data including the fixed facial landmarks and the static key points or features or elements in the background, and the combining of the image data with corresponding position/orientation data associated with the computing device 200 as the series of frames of image data is collected, may improve the level of accuracy in prediction of fit of the head mounted wearable device.

In the examples described above, the movement of the computing device 200 is in a substantially vertical direction, in front of the user, in a substantially horizontal direction, across the front and to the left and right side profiles of the user, while the head and face of the user remain substantially still, or static. The image data obtained through the example movement of the computing device 200 as shown in FIGS. 5A-5E and 6A-6D may provide for the relatively clear and detectable capture of the fixed facial landmarks and/or static key points/fixed elements in the background from the changing perspective of the computing device relative to the head/face of the user as the computing device 200 is moved. In some examples, systems and methods, in accordance with implementations described herein, may be accomplished using other movements of the computing device 200 relative to the user.

Systems and methods, in accordance with implementations described herein, have been presented with respect to the prediction of fit for a head mounted wearable device, simply for purposes of discussion and illustration. The principles described herein may be applied to the prediction of fit for other types of wearable devices. Similarly, systems and methods, in accordance with implementations described herein, have been presented using head width HW and/or nose length NL and/or nose width NW and/or ILCD and/or IMCD as example fixed facial measures, simply for purposes of discussion and illustration. Other facial and/or cranial and/or ophthalmic landmarks from which other facial and/or cranial and/or ophthalmic features and/or measurements may be detected may also be applied, alone, or together with these landmarks and associated measurements, to accomplish the disclosed prediction of fit.

Systems and methods, in accordance with implementations described herein, provide for the prediction of fit of a wearable device from image data and position/orientation data using a client computing device. In some implementations, systems and methods, in accordance with implementations described herein, provide for the determination of scale from the image data and position/orientation data obtained using the client computing device. Systems and methods, in accordance with implementations described herein, may provide for the prediction of fit from image data and position/orientation data without the use of a known reference object. Systems and methods, in accordance with implementations described herein, may predict fit from image data and position/orientation data without the use of specialized equipment such as, for example, depth sensors, pupilometers and the like that may not be readily available to the user. Systems and methods, in accordance with implementations described herein, may predict from image data and position/orientation data without the need for a proctored virtual fitting and/or access to a physical retail establishment. Systems and methods, in accordance with implementations described herein, may improve accessibility to the virtual selection and accurate fitting of wearable devices. The prediction of fit in this manner provides for a virtual try on of an actual wearable device to determine wearable fit and/or ophthalmic fit and/or display fit of the wearable device.

Figure 9:
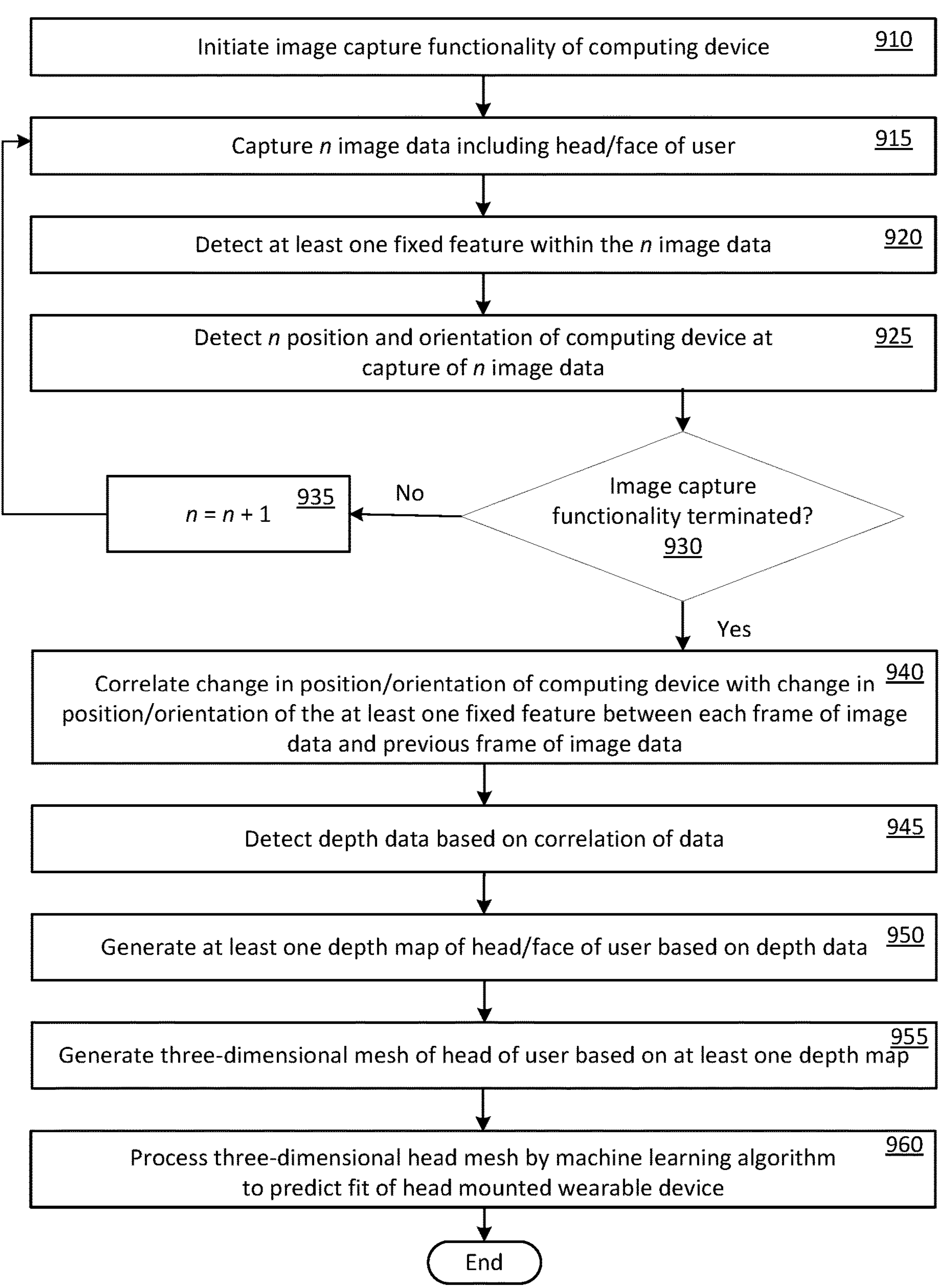
FIG. 9 is a flowchart of an example method, in accordance with implementations described herein.

FIG. 9 is a flowchart of an example method 900 of predicting fit from image data and position/orientation data. A user operating a computing device (such as, for example, the computing device 200 described above) may initiate image capture functionality of the computing device (block 910). In some examples, the image capture functionality may be operable within an application executing on the computing device. Initiation of the image capture functionality may cause an image sensor (such as, for example, the image sensor 222 of the front facing camera of the computing device 200 described above) to capture first image data including a face and/or a head of the user (block 915). At least one fixed feature may be detected within the first image data (block 920). The at least one fixed feature may include fixed facial features and/or landmarks that remain substantially static, and/or fixed or static key points or features in a background area surrounding the head/face of the user in the first image data. A first position and orientation of the computing device may be detected (block 925) based on, for example, data provided by position/orientation sensors of the computing device at a point corresponding to capture of the first image data.

Continued operation of the image capture functionality may cause the computing device to incrementally capture second image data including the face and/or a head of the user and the at least one fixed feature (block 930, block 935), until the image capture functionality is terminated. In some examples, the image capture functionality may be terminated when it is determined, for example, within the application executing on the computing device, that a sufficient amount of image data has been captured for the development of a three-dimensional mesh/three-dimensional model of the face and/or head of the user for the purposes of predicting fit of a head mounted wearable device. Changes in the position and the orientation of the computing device may be correlated with changes in position of the at least one fixed feature detected in a current frame of image data compared to the position of the at least one fixed feature detected in a previous frame of image data (block 940). Depth data may be extracted based on the comparison of the current image frame of data to the previous image frame of data, and the respective position of the at least one fixed feature (block 945). At least one depth map of the face and/or head of the user may be generated based on the depth data extracted from the correlation of the position/orientation data of the computing device with the changes of position in the at least one fixed feature detected in the frames of image data (block 950). The depth maps may be fused, or stitched, together to develop a three-dimensional mesh, or a three-dimensional model, of the face and/or head of the user (block 955). The three-dimensional mesh, and/or measurements extracted therefrom, may be processed by a machine learning model, to predict fit of a head mounted wearable device for the user (block 960).

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:

generating a three-dimensional model of a head of a user based on depth data extracted from a correlation of a change in position and orientation of a computing device with a change in position and orientation of at least one feature between a first image data and a second image data, the at least one feature including a distance between at least two elements detected at locations fixed in a background area, the first image data and the second image data including the head of the user and captured via an application executing on the computing device; and predicting, by a machine learning model accessible to the computing device, a fit of a first wearable device of a plurality of wearable devices on the head of the user based on the three-dimensional model of the head of the user;

wherein the predicting includes predicting a fit of the first wearable device according to at least one measurement extracted from the three-dimensional model and fit data indicating a fit of respective ones of the plurality of wearable devices on a plurality of users, the fit data based on a plurality of different measurements of the plurality of users, wherein the at least one measurement extracted from the three-dimensional model corresponds to one or more of the plurality of different measurements.

2. The computer-implemented method of claim 1, wherein the at least one feature includes at least two facial landmarks that are representative of a facial measurement.

3. The computer-implemented method of claim 2, wherein the facial measurement includes at least one of:

a distance between a first ear saddle point and a second ear saddle point representative of a head width of the user;

a distance between an outer corner portion of a right eye and an outer corner portion of a left eye of the user; or a distance between an inner corner portion of a right eye and an inner corner portion of a left eye of the user.

4. The computer-implemented method of claim 1, wherein the at least one feature includes a plurality of features, including:

at least one facial feature defined by two facial landmarks.

5. The computer-implemented method of claim 1, wherein detecting the change in the position and the orientation of the computing device includes:

detecting a first position and a first orientation of the computing device in response to receiving first data provided by an inertial measurement unit of the computing device at a capturing of the first image data;

detecting a second position and a second orientation of the computing device in response to receiving second data provided by the inertial measurement unit of the computing device at a capturing of the second image data; and determining a magnitude of movement of the computing device corresponding to the change in the position and the orientation of the computing device based on a comparison of the second data and the first data.

6. The computer-implemented method of claim 5, wherein correlating the change in the position and the orientation of the computing device with the change in the position of the at least one feature includes:

associating the magnitude of the movement of the computing device to a change in a measurement associated with the at least one feature; and determining the depth data based on the associating.

7. The computer-implemented method of claim 1, further comprising:

repeatedly capturing image data as the computing device is moved relative to the user to capture image data from a plurality of different positions and orientations of the computing device relative to the head of the user;

correlating a plurality of changes in position and orientation of the computing device with a corresponding plurality of changes in position of the at least one feature detected in the image data;

determining depth data as the image data is repeatedly captured from the plurality of different positions and orientations based on the correlating; and developing the three-dimensional model of the head of the user for predicting the fit of the wearable device based on the repeatedly capturing of the image data by the computing device from the plurality of different positions and orientations and the depth data determined from the repeatedly capturing of the image data.

8. The computer-implemented method of claim 1, wherein predicting, by the machine learning model accessible to the computing device, the fit of the wearable device includes:

selecting a wearable device, from the plurality of wearable devices, based on the at least one measurement.

9. The computer-implemented method of claim 8, wherein the at least one measurement includes at least one of:

a cranial measurement determined based on distance between two facial features detected in the second image data and the first image data; or an ophthalmic measurement determined based on a distance between two optical features detected in the second image data and the first image data.

10. The computer-implemented method of claim 1, wherein the at least two elements detected in a background area include geometric features detected in a repeating pattern.

11. The computer-implemented method of claim 1, further comprising generating a prompt that includes instructions to repeat a capturing of the first image data and the second image data with a change to an ambient environment to include features in a background of the first image data and the second image data.

12. A non-transitory computer-readable medium storing executable instructions that when executed by at least one processor of a computing device are configured to cause the at least one processor to:

generate a three-dimensional model of a head of a user based on depth data extracted from a correlation of a change in position and orientation of the computing device with a change in position and orientation of at least one feature between a first image data and a second image data, the at least one feature including a distance between at least two elements detected at locations fixed in a background area and the first image data and the second image data including the head of the user captured via an application executing on the computing device; and predict, by a machine learning model accessible to the computing device, a fit of a first wearable device of a plurality of wearable devices on the head of the user based on the three-dimensional model of the head of the user;

wherein the predict by a machine learning model includes predicting a fit of the first wearable device according to at least one measurement extracted from the three-dimensional model and fit data indicating a fit of respective ones of the plurality of wearable devices on a plurality of users, the fit data based on a plurality of different measurements of the plurality of users associated with the at least one measurement extracted from the three-dimensional model.

13. The non-transitory computer-readable medium of claim 12, wherein the at least one feature includes at least two facial landmarks that are representative of a facial measurement, including at least one of:

a distance between a first ear saddle point and a second ear saddle point representative of a head width of the user;

a distance between an outer corner portion of a right eye and an outer corner portion of a left eye of the user;

a distance between an inner corner portion of the right eye and an inner corner portion of the left eye of the user; or a distance between a pupil of the right eye and a pupil of the left eye of the user.

14. The non-transitory computer-readable medium of claim 12, wherein the executable instructions cause the at least one processor to detect the change in the position and the orientation of the computing device, including:

detect a first position and a first orientation of the computing device in response to receiving first data provided by an inertial measurement unit of the computing device at a capture of the first image data;

detect a second position and a second orientation of the computing device in response to receiving second data provided by the inertial measurement unit of the computing device at a capture of the second image data; and determine a magnitude of movement of the computing device corresponding to the change in the position and the orientation of the computing device based on a comparison of the second data and the first data.

15. The non-transitory computer-readable medium of claim 14, wherein the executable instructions cause the at least one processor to:

associate the magnitude of the movement of the computing device to a change in a measurement associated with the at least one feature; and determine depth data based on the associating.

16. The non-transitory computer-readable medium of claim 12, wherein the executable instructions cause the at least one processor to:

repeatedly capture image data as the computing device is moved relative to the user to capture image data from a plurality of different positions and orientations of the computing device relative to the head of the user;

correlate a plurality of changes in position and orientation of the computing device with a corresponding plurality of changes in position of the at least one feature detected in the image data;

determine depth data as the image data is repeatedly captured from the plurality of different positions and orientations based on the correlating; and develop the three-dimensional model of the head of the user for predicting the fit of the wearable device based on the repeatedly capturing of the image data by the computing device from the plurality of different positions and orientations and the depth data determined from the repeatedly capturing of the image data.

17. The non-transitory computer-readable medium of claim 12, wherein the executable instructions cause the at least one processor to:

select a wearable device, from the plurality of wearable devices, based on the at least one measurement, the at least one measurement including at least one of:

a cranial measurement determined based on distance between two facial features detected in the second image data and the first image data; or an ophthalmic measurement determined based on a distance between two optical features detected in the second image data and the first image data.

18. A system, comprising:

a computing device, including:

an image sensor;

at least one processor; and a memory storing instructions that, when executed by the at least one processor, cause the at least one processor to:

generate a three-dimensional model of a head of a user based on depth data extracted from a correlation of a change in position and orientation of the computing device with a change in position and orientation of at least one feature between a first image data and a second image data, the at least one feature including a distance between at least two elements detected at locations fixed in a background area and the first image data and the second image data including the head of the user and captured via an application executing on the computing device; and predict, by a machine learning model accessible to the computing device, a fit of a first wearable device of a plurality of wearable devices on the head of the user based on the three-dimensional model of the head of the user;

wherein the predict by a machine learning model includes predicting a fit of the first wearable device according to at least one measurement extracted from the three-dimensional model and fit data indicating a fit of respective ones of the plurality of wearable devices on a plurality of users, the fit data based on a plurality of different measurements of the plurality of users, wherein the at least one measurement extracted from the three-dimensional model corresponds to one or more of the plurality of different measurements.

19. The system of claim 18, wherein the instructions cause the at least one processor to:

generate the three-dimensional model of the head of the user;

extract at least one measurement from the three-dimensional model of the head of the user; and select a wearable device, from a plurality of available wearable devices, based on the at least one measurement, the at least one measurement including at least one of:

a cranial measurement determined based on distance between two facial features detected in the second image data and the first image data; or an ophthalmic measurement determined based on a distance between two optical features detected in the second image data and the first image data.

20. The system of claim 18, wherein the at least one feature includes a plurality of features, including:

at least one facial landmark defined by at least two facial features.

* * * * *